United States Patent
Veness et al.

(10) Patent No.: US 12,439,886 B2
(45) Date of Patent: Oct. 14, 2025

(54) PET CARRIER

(71) Applicant: Doskocil Manufacturing Company, Inc., Arlington, TX (US)

(72) Inventors: David Veness, Fort Worth, TX (US); Michael Harper, Fort Worth, TX (US); Karl Boehringer, Grapevine, TX (US); Ryan Paxson, Elk Rapids, MI (US); Linh Huynh, Arlington, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 15 days.

(21) Appl. No.: 18/124,422

(22) Filed: Mar. 21, 2023

(65) Prior Publication Data
US 2023/0301269 A1    Sep. 28, 2023

Related U.S. Application Data

(60) Provisional application No. 63/322,564, filed on Mar. 22, 2022.

(51) Int. Cl.
*A01K 1/02*    (2006.01)

(52) U.S. Cl.
CPC .................................. *A01K 1/0245* (2013.01)

(58) Field of Classification Search
CPC ...... A01K 1/033; A01K 1/034; A01K 1/0272; A01K 1/0281; B65D 2543/00444; B65D 2543/00574; B65D 2543/00583; B65D 43/22; B65D 45/16; B65D 85/50
See application file for complete search history.

(56) References Cited

U.S. PATENT DOCUMENTS

| | | | | | |
|---|---|---|---|---|---|
| 3,212,474 | A | * | 10/1965 | Higgins | A01K 1/031 119/475 |
| 4,976,219 | A | * | 12/1990 | Goguen | A01K 1/0245 119/496 |
| 5,462,015 | A | * | 10/1995 | Murphy | E05C 3/041 292/241 |

(Continued)

OTHER PUBLICATIONS

My Pets Care Tips; Amazon Basics Two Door Top Load Pet Kennel; YouTube; Sep. 5, 2019. [retrieved on May 8, 2023]; Retrieved from internet: <URL: http://www.youtube.com/watch?v=WM1tMlvmsWM> entire video.

(Continued)

*Primary Examiner* — Kimberly S Berona
*Assistant Examiner* — Nevena Aleksic
(74) *Attorney, Agent, or Firm* — Foley & Lardner LLP

(57) ABSTRACT

A carrier includes a body and a cover portion. The body has a generally circular bottom portion and a generally circular top portion and an opening in the top portion. The bottom portion is configured to be placed on a surface. The opening is the only opening sized and configured to enable an animal to enter or exit the body and enables an animal to enter or exit the body in a vertical manner when the bottom portion is placed on the surface. The cover portion is sized and configured to fit within the opening of the top portion. The cover portion is hingedly attached to the top portion at a first side and includes a latching mechanism at a second side. The latching mechanism enables the cover to be disposed in a latched state to close the opening in the top portion.

20 Claims, 28 Drawing Sheets

(56) References Cited

U.S. PATENT DOCUMENTS

| | | | |
|---|---|---|---|
| 5,699,754 A * | 12/1997 | Cahajla | A01K 1/0114 |
| | | | 119/165 |
| 6,523,499 B1 | 2/2003 | Chrisco et al. | |
| 6,588,373 B1 * | 7/2003 | Strzempko | A01K 1/031 |
| | | | 119/416 |
| 8,127,719 B2 | 3/2012 | Jakubowski et al. | |
| 8,341,815 B2 | 1/2013 | Leung | |
| 8,347,815 B2 * | 1/2013 | Leung | A01K 1/0245 |
| | | | 119/482 |
| 9,095,120 B1 * | 8/2015 | Skaggs | A01K 1/0245 |
| 9,380,759 B2 | 7/2016 | Veness et al. | |
| 2010/0192870 A1 * | 8/2010 | Wood | A01K 1/0245 |
| | | | 29/428 |
| 2011/0079971 A1 * | 4/2011 | Lulevitch | A01K 1/0245 |
| | | | 280/28.12 |
| 2021/0329879 A1 | 10/2021 | Veness et al. | |

OTHER PUBLICATIONS

International Search Report issued Jun. 15, 2023 in corresponding International Application No. PCT/US2023/015853.

* cited by examiner

PET CARRIER

BACKGROUND

Field of the Invention

The present disclosure relates to a pet carrier. In particular, the present invention relates to a pet carrier with a single opening in the top surface thereof.

Background Art

There are many types of conventional pet carriers that are designed to transport pets or animals. Many conventional carriers are plastic molded two-piece structures. When assembled, the two-piece structures form an opening in the front of the carrier that enables an animal to enter and exit. These carriers can also include a handle on the top portion that enables the carrier to be carried.

SUMMARY

It has been determined that a need for an improved pet carrier exists. Many of the conventional pet carriers include an opening in the front of the carrier. It has been determined that many animals, in particular, cats, do not like being placed into the front of a carrier. The animal can resist, resulting in a difficult and dangerous situation. Therefore, it has been determined that the front opening in many carriers is undesired or unused. Moreover, it has been discovered that some animals prefer a circular sleeping area.

Accordingly, it has been determined that a generally circular carrier having a single top loading opening is desired. A first aspect of such a carrier includes a generally circular body and a generally circular cover portion. The body has a bottom portion and a top portion and an opening in the top portion. The bottom portion is configured to be placed on a surface. The opening is the only opening sized and configured to enable an animal to enter or exit the body and enables an animal to enter or exit the body in a vertical manner when the bottom portion is placed on the surface. The cover portion is sized and configured to fit within the opening of the top portion. The cover portion is hingedly attached to the top portion at a first side and includes a latching mechanism at a second side. The latching mechanism enables the cover to be disposed in a latched state to close the opening in the top portion.

The embodiments disclosed herein provide a generally circular carrier with a single top loading opening for animals that reduces or eliminates the resistance from animals, resulting in an easier and safer situation in which an animal can be loaded.

Moreover, the embodiments disclosed herein provide a feeling safety for the animals decreasing the likelihood that the animal will resist entry into the kennel.

BRIEF DESCRIPTION OF THE DRAWINGS

The invention will be explained in more detail hereinafter with reference to the drawings.

DETAILED DESCRIPTION OF THE EMBODIMENTS

Figure 1:
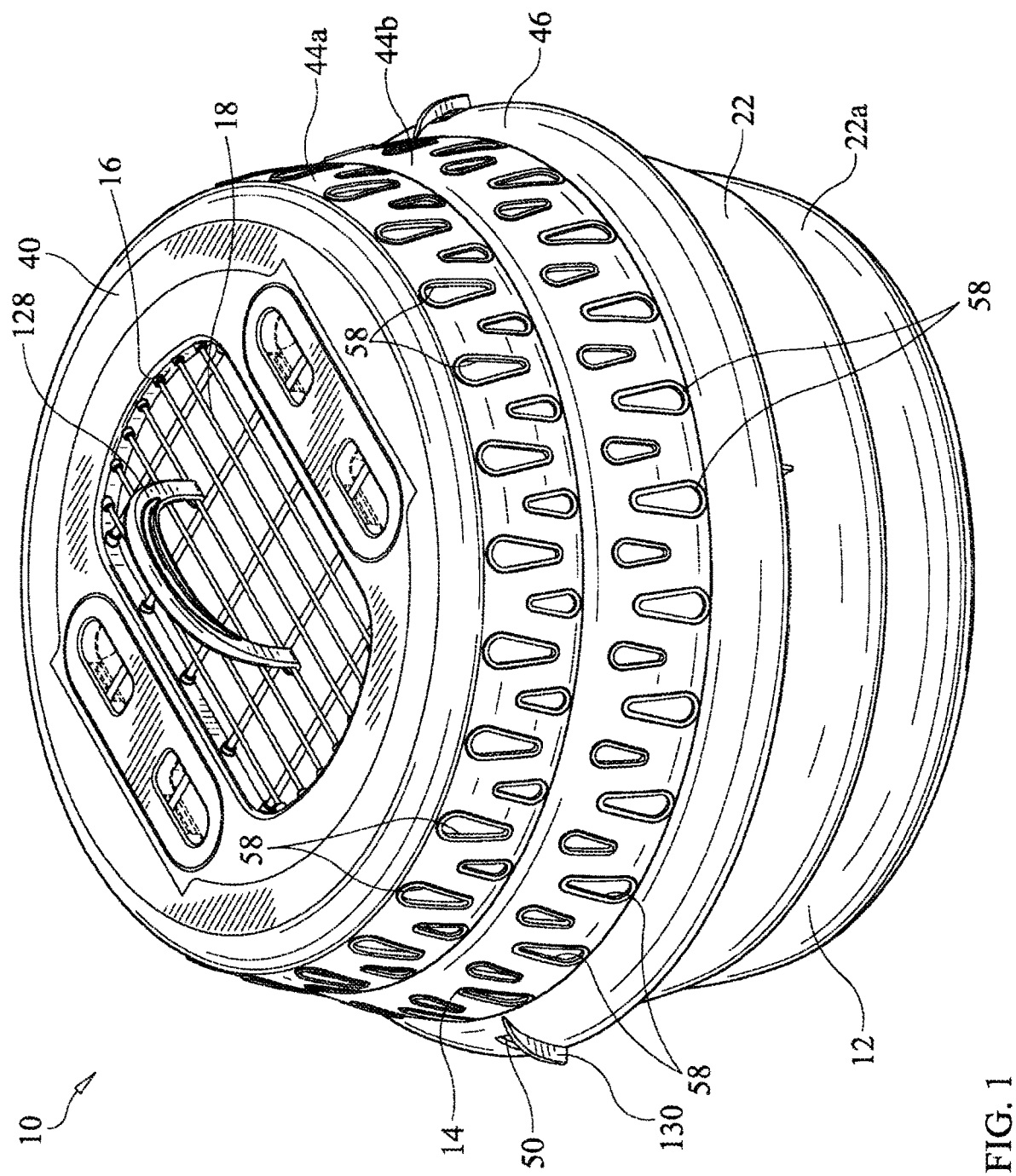
FIG. 1 is a top perspective view of a pet kennel/pet carrier in accordance with a first embodiment.
Figure 2:
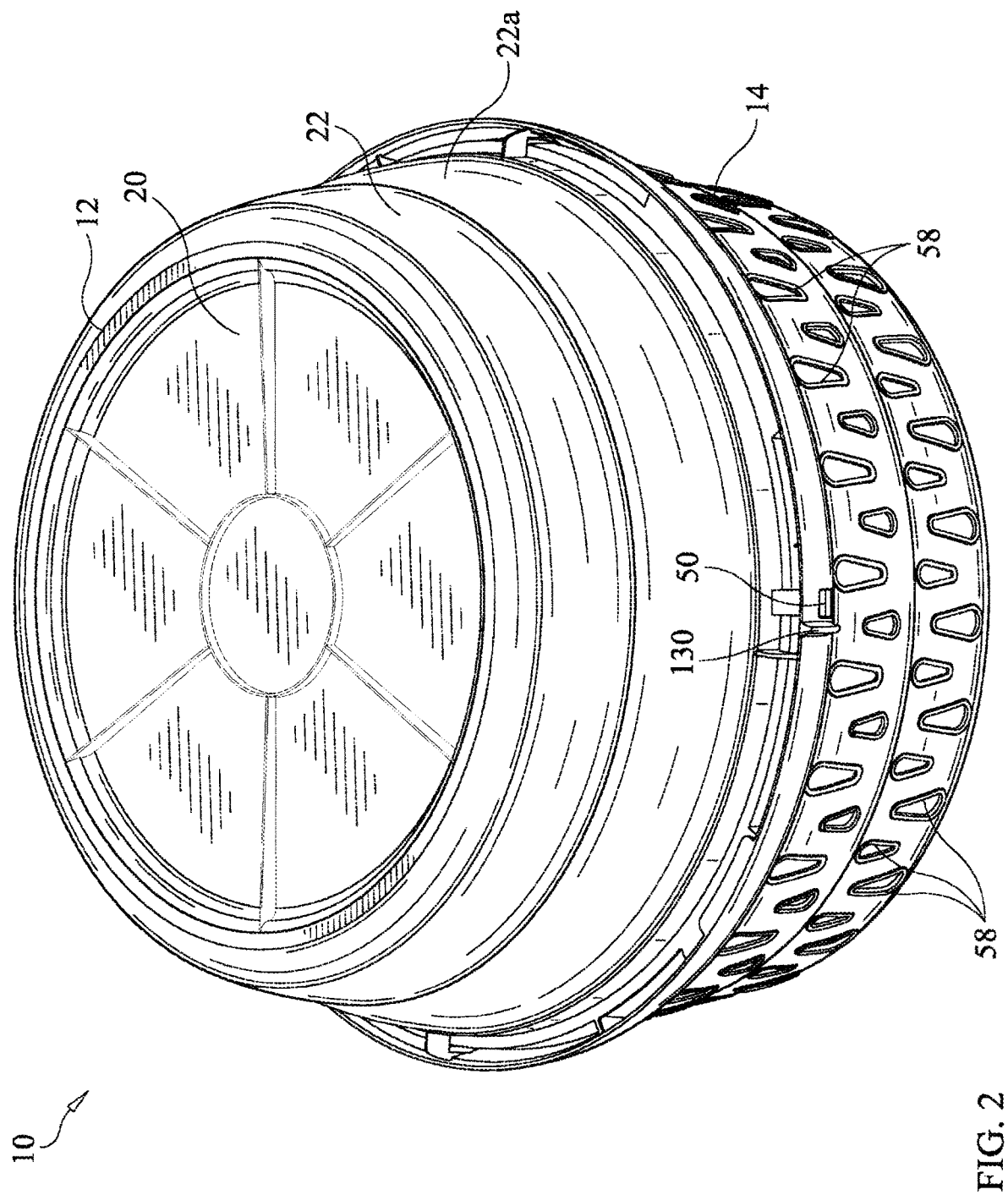
FIG. 2 is a bottom perspective view of the pet kennel/pet carrier in accordance with the first embodiment.

The Figures illustrate various embodiments of the present invention. Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-15, a pet carrier 10 (hereinafter the body 10 or carrier 10) is illustrated in accordance with a first embodiment. The carrier 10 has a generally circular shaped body with a generally circular bottom portion 12, a generally circular top portion 14 with an opening 16 therein and an upper door or cover portion 18.

The bottom portion 12 is preferably a plastic molded structure with a bottom wall 20 having a bottom surface 20a (FIGS. 7 and 13-14) and a side wall 22 extending upwardly from the bottom wall 20. The bottom portion 12 can be generally cylindrical or a conical shape or a combination of the two shapes. The bottom surface 20a of the bottom wall 20 is preferably flat. The side wall 22 has an annular-like surface defining cylindrical shapes and/or overall conical shapes. In the depicted embodiment, the side wall 22 has a conical shape resembling a cone with a smaller diameter section thereof being removed and replaced with the bottom wall 20.

Figure 7:
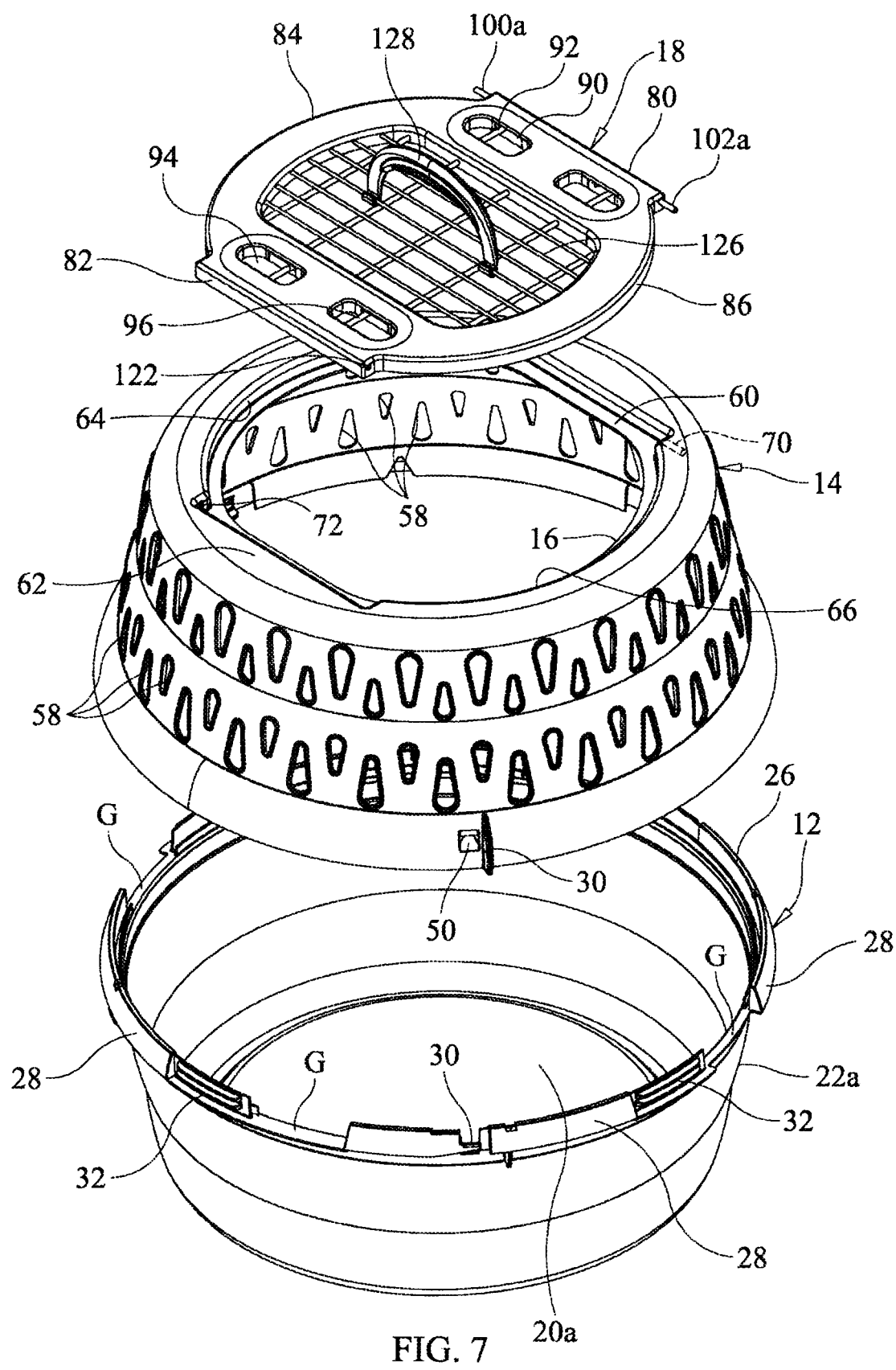
FIG. 7 is an exploded top perspective view of the pet kennel/pet carrier showing a bottom portion, a top portion and a cover portion of the pet kennel/pet carrier in accordance with the first embodiment.
Figure 13:
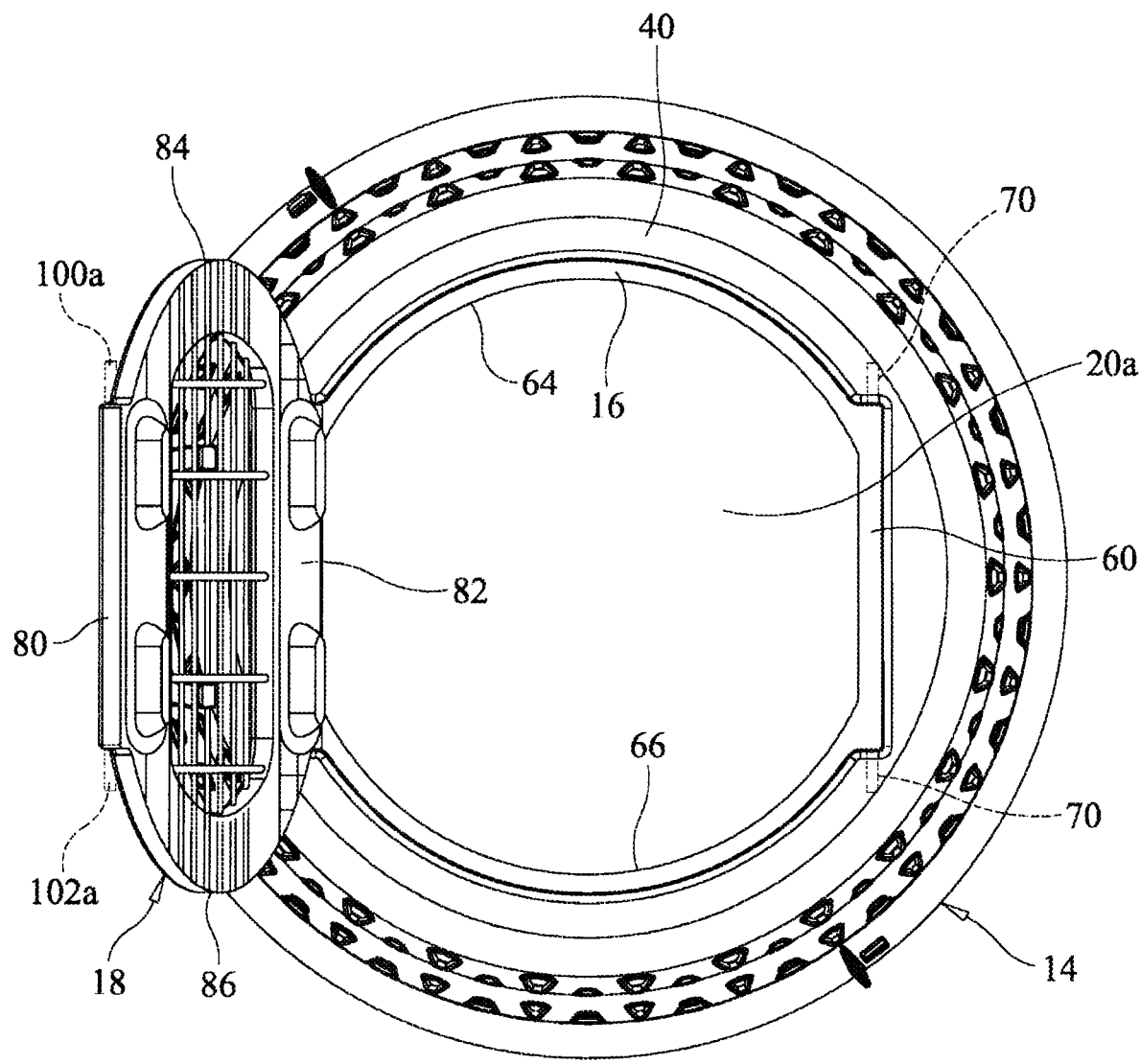
FIG. 13 is a top view of the of the pet kennel/pet carrier showing the cover portion in the second open orientation with the second hinge/latch mechanism operating as a hinge and the first hinge/latch mechanism operated as a latch mechanism in accordance with the first embodiment.
Figure 14:
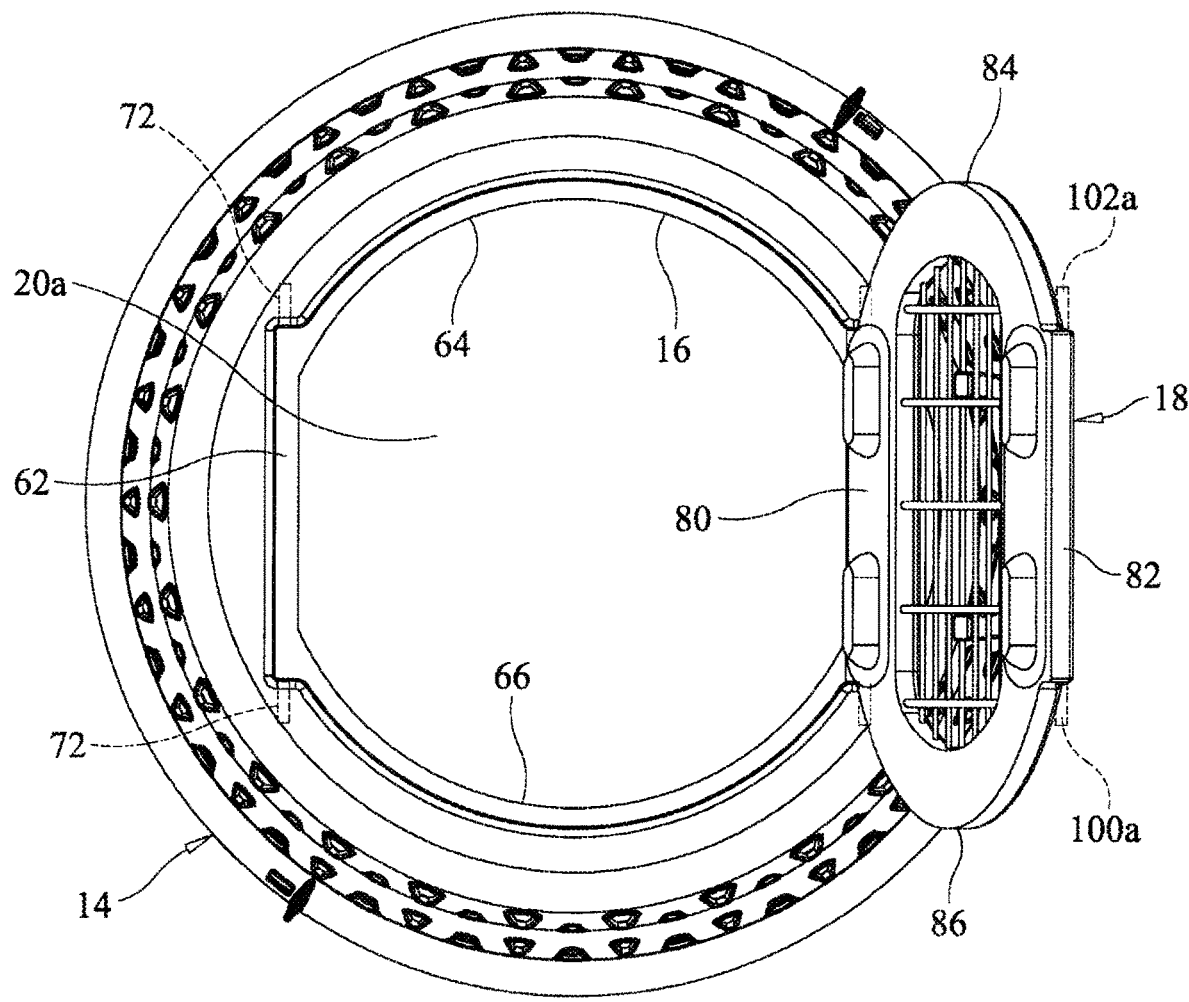
FIG. 14 is a top view of the of the pet kennel/pet carrier similar to FIG. 13 showing the cover portion in the first open orientation with the first hinge/latch mechanism operating as a hinge and the second hinge/latch mechanism operated as a latch mechanism in accordance with the first embodiment.

As shown in FIGS. 7, 13 and 14, the generally flat bottom surface 20a emulates a calming bed for an animal. As can be understood, these types of calming beds are capable of providing security for animal, for example cats. The circular calming bed can de-activate an animal's nervous system to enable the animal to calm down quickly and relax. This type of anti-anxiety bed can be an ideal safe and secure place for a pet to sleep.

The side wall 22 is circular (cylindrical or conical) and extends upward from the bottom surface 20a at an angle other than 90 degrees, such that an outer wall surface 22a extends radially outwardly from the bottom surface 20a upward. Such a configuration enables the interior of the carrier 10 to increase in size an upward direction. This structure can form an increased interior area for the animal or pet, while reducing the overall footprint of the carrier 10. In the depicted embodiment the bottom wall 20 can also have a stepped configuration in which the bottom wall 20 has a series of rings that increase in cross sectional area in the upward direction. The sides of each of the rings can have an arcuate configuration. It is noted that the angle of the wall surface 22a can extend at any angle desired, including 90 degrees, less than 90 degrees or greater than 90 degrees.

Figure 17:
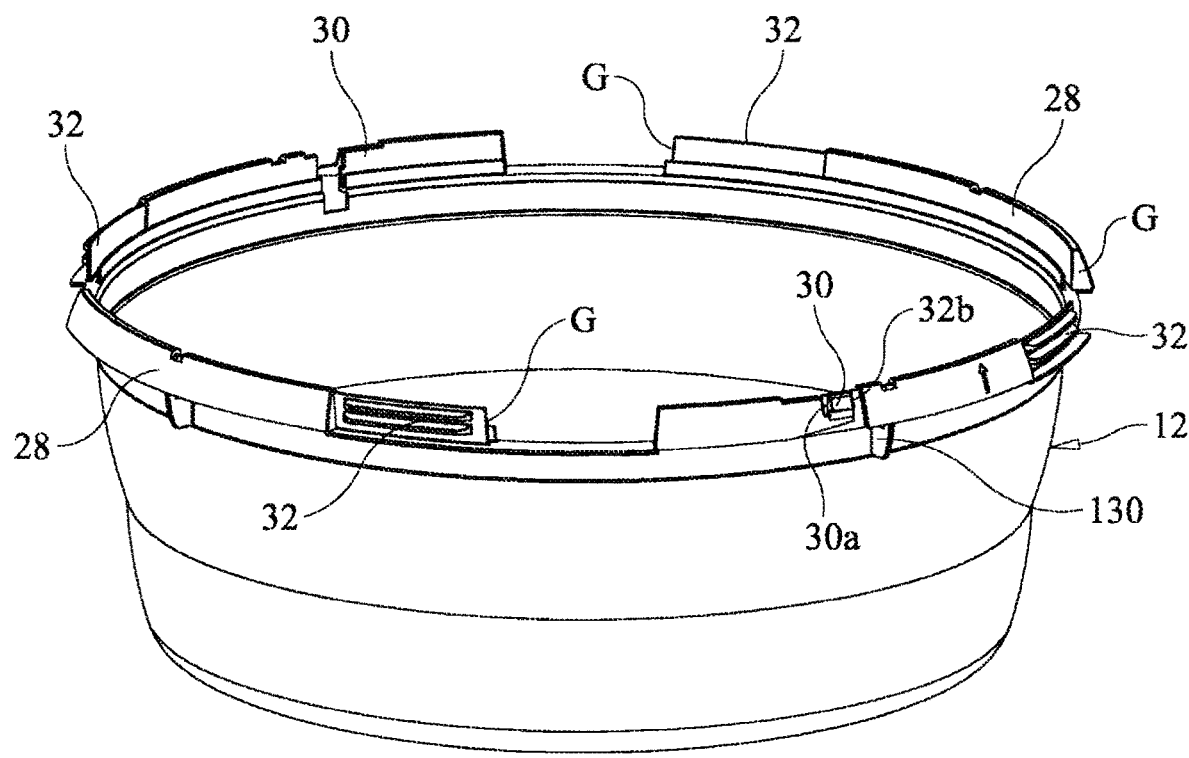
FIG. 17 is a perspective view of the bottom portion with the top portion removed in accordance with the first embodiment.

As shown in the FIGS. 7 and 17, an upper edge 26 of the bottom portion 12 can include an outwardly extending protrusions 28 or flange 28 that that includes latch members 30 and circumferentially extending thread sections 32.

Figure 9:
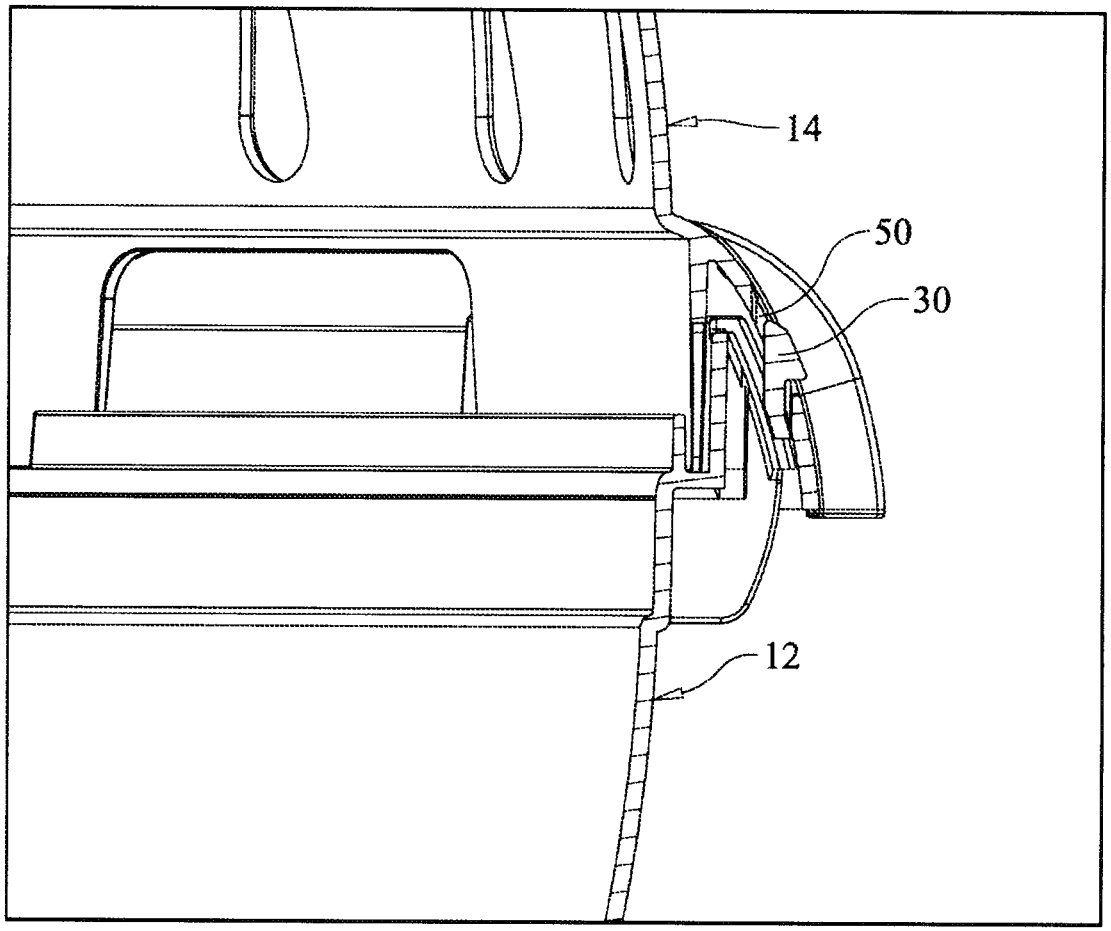
FIG. 9 is another cross-sectional view of another portion of the bottom portion and the top portion showing an outwardly biased button or latch portion of the bottom portion and a latch opening of the top portion with the latch portion biased such that the latch portion extends into the latch opening of the top portion of the pet kennel/pet carrier in accordance with the first embodiment.

Each of the latch members 30 includes a locking protrusion 36 and is configured to flex or move in a radial direction. As shown in FIGS. 9 and 17, each the latch member 30 (also referred to as a locking protrusion 30) has a first circumferential end 30a attached to the flange 28 and a second circumferential end 30b that is free or not attached to the wall surface. In other words, the second circumferential end 5ob can be spaced apart or at least separated from the adjacent circumferential section of the flange 28. This configuration enables each of the latch members 30 to radially flex. The locking protrusion 30 can be disposed on the second end and have an angled surface on the outer radially side of the latch member.

As shown in FIGS. 1, 3, 5-9, 11-15 and 20-25, the top portion 14 is preferably a plastic molded structure with a top surface 40 and a side wall 42 defining an outer wall surface 42a (referred to hereinafter as a wall surface 42a) that extends downwardly from the top surface 40. The wall surface 42 is generally circular and extends from the top surface 40 at an angle other than 90 degrees, such that the wall surface 42a extends radially outwardly in a downward direction from the top surface 40. Hence, the circular shape is a conical shape. Such a configuration enables the interior of the top portion 14 of the carrier 10 to increase in a downward direction approaching the bottom portion 12. This structure forms an increased interior area for the pet, while reducing the overall top surface of the carrier 10. In the depicted embodiment, the top portion 14 has a stepped configuration in which the top portion 14 has a series of rings 44a and 44b that increase in cross sectional area in the downward direction. The side surfaces of each of these rings 44a and 44b can have an arcuate configuration. A bottom ring 46 of the top portion 14 is defined by an annular ring having an outer diameter that is greater than the outer diameters of the rings 44a and 44b. The bottom ring 46 can have a curved overall shape as viewed from a side thereof and thus forms an edge 48 that extends slightly outwardly.

The bottom ring 46 includes a pair of openings 50 positioned such that can be each can be brought into alignment with a corresponding one of the latch members 30 adjacent to the upper edge 26 of the bottom portion 12 during attachment of the top portion 14 with the bottom portion 12. When the latch members 30 are brought into alignment with the openings 50, the latch members 30 are biased to move into the openings 50, thereby coupling or locking the top portion 14 to the bottom portion 12, as is described further below.

Figure 8:
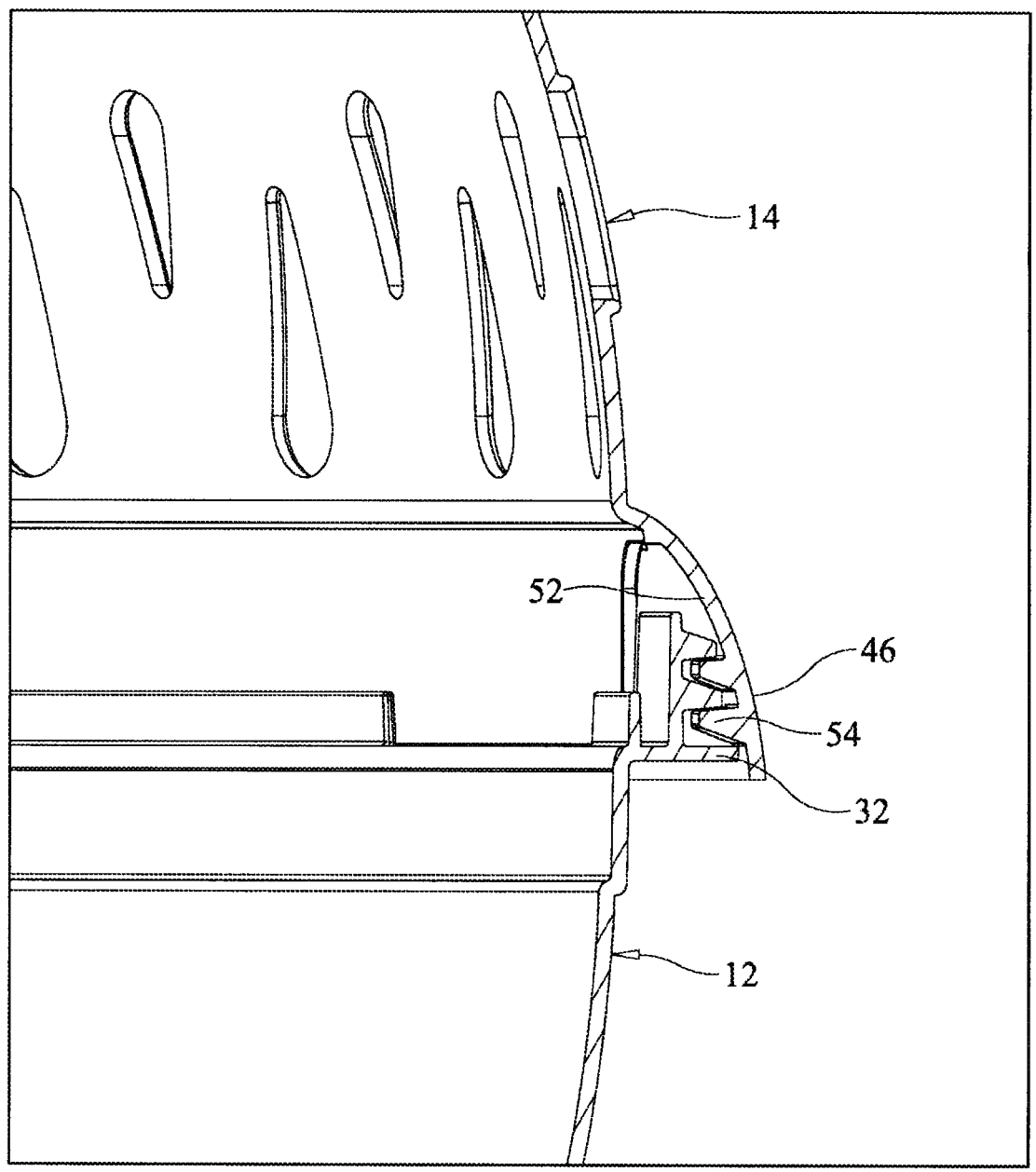
FIG. 8 is a cross-sectional view of a portion of the bottom portion and the top portion showing a threaded portion formed on a radially outward area of the bottom portion and a threaded portion formed on a radially inward area of the top portion of the pet kennel/pet carrier in accordance with the first embodiment.

As shown in FIG. 8, the radially inner side 52 of the bottom ring 46 of the top portion 14 includes circumferentially extending thread section 54. As shown in FIG. 8, the circumferentially extending thread sections 32 of the bottom portion 12 mate with the circumferentially extending thread sections 54 of the top portion 14 when the two are installed to one another, as is described further below. The circumferentially extending thread sections 54 are preferably molded on the inner radial side 52 (the surface thereof). The circumferentially extending thread sections 32 are preferably molded to an outboard area along the upper edge 26 of the bottom portion 12.

The threads 32 and 54 are equally spaced in the circumferential direction along the perimeter of the top and bottom portion 14 and 12 and engage when the top portion 14 is attached to the bottom portion 12. That is, the threads 32 and 54 are engaged with one another when the locking members 30 (also referred to as the locking protrusions 30) are engaged with the openings 50 in the bottom ring 46 of the top portion 14. When the locking protrusions 30 are engaged with the openings 50 in the bottom ring 46, the threads 32 and 54 cannot be disengaged. When the locking protrusions 30 are pressed radially inward by a pet owner, the locking protrusions 30 are no longer restricted in the openings 50 allowing removal of the top portion 14 from the bottom portion 12. It should be understood that the threads 32 and 54 extend circumferentially any angular values between 5 and 20 degrees of the 360 degree circumference of the carrier 10. In other words, the threads 32 and 54 do not extend completely around the upper edge 26 of the bottom portion 12 and the bottom ring 46 of the top portion 14.

The side wall 42 of the top portion 14 is also provided with a plurality of vent holes 58.

Figure 3:
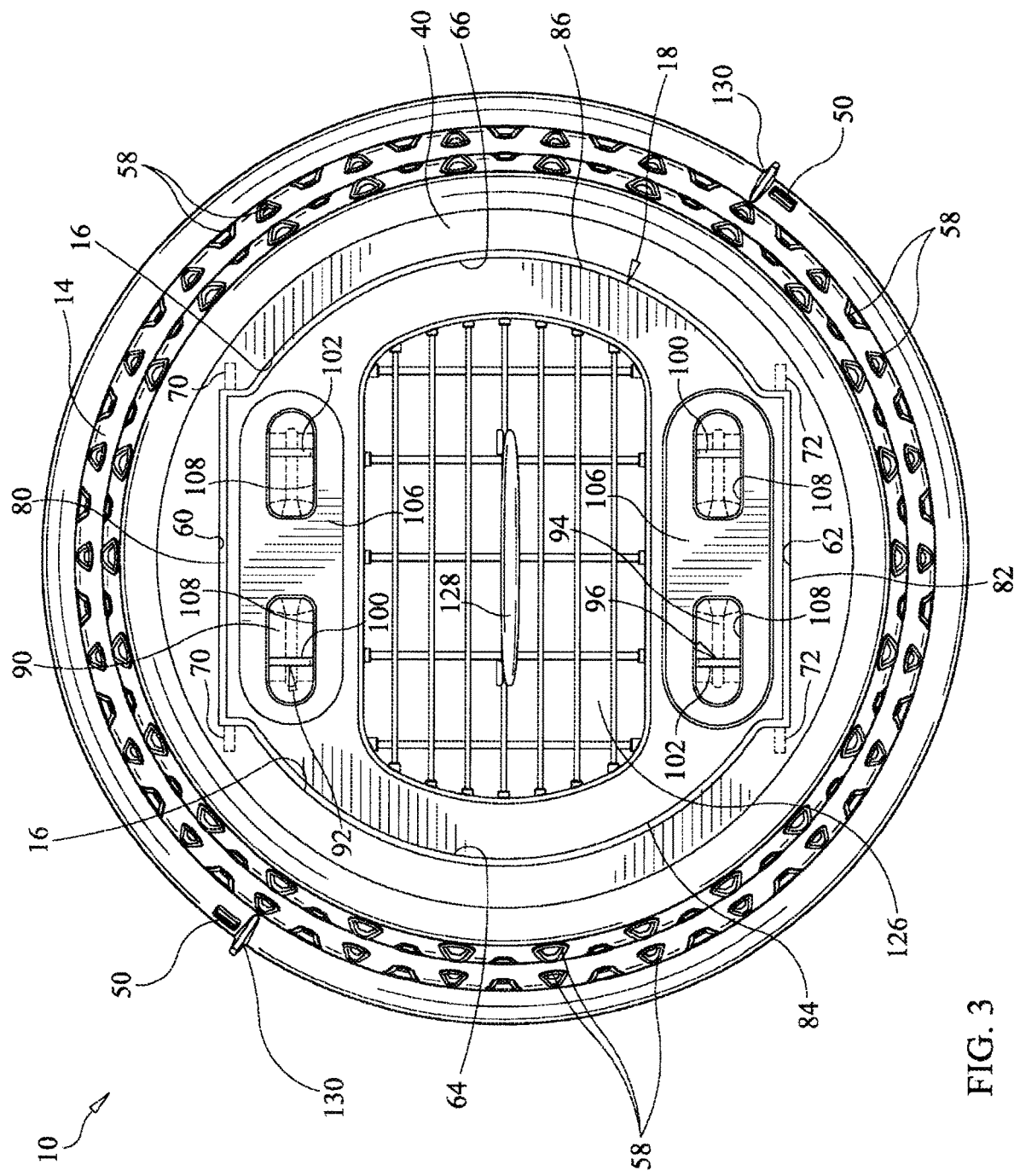
FIG. 3 is a top view of the pet kennel/pet carrier in accordance with the first embodiment.
Figure 4:
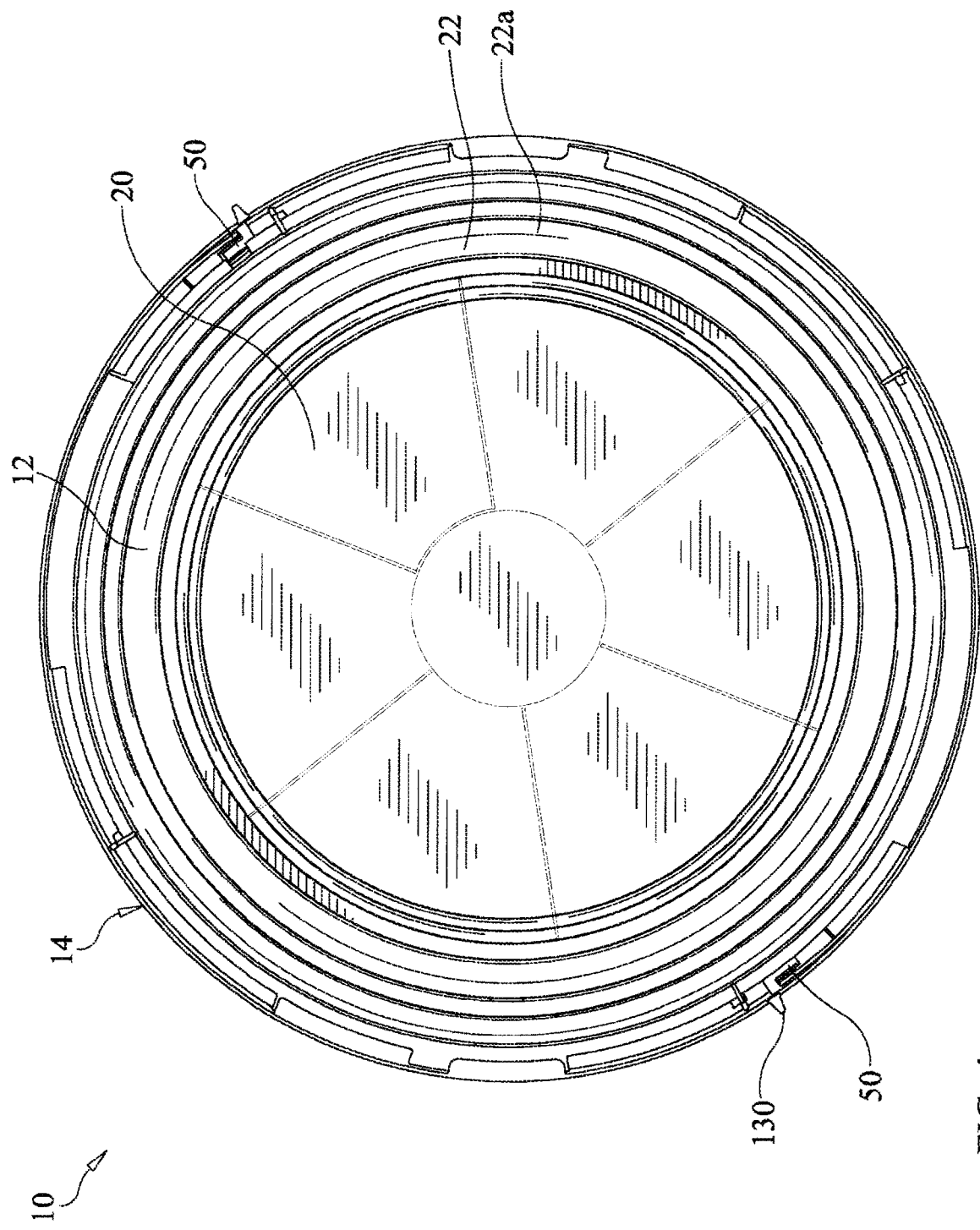
FIG. 4 is a bottom view of the pet kennel/pet carrier in accordance with the first embodiment.
Figure 5:
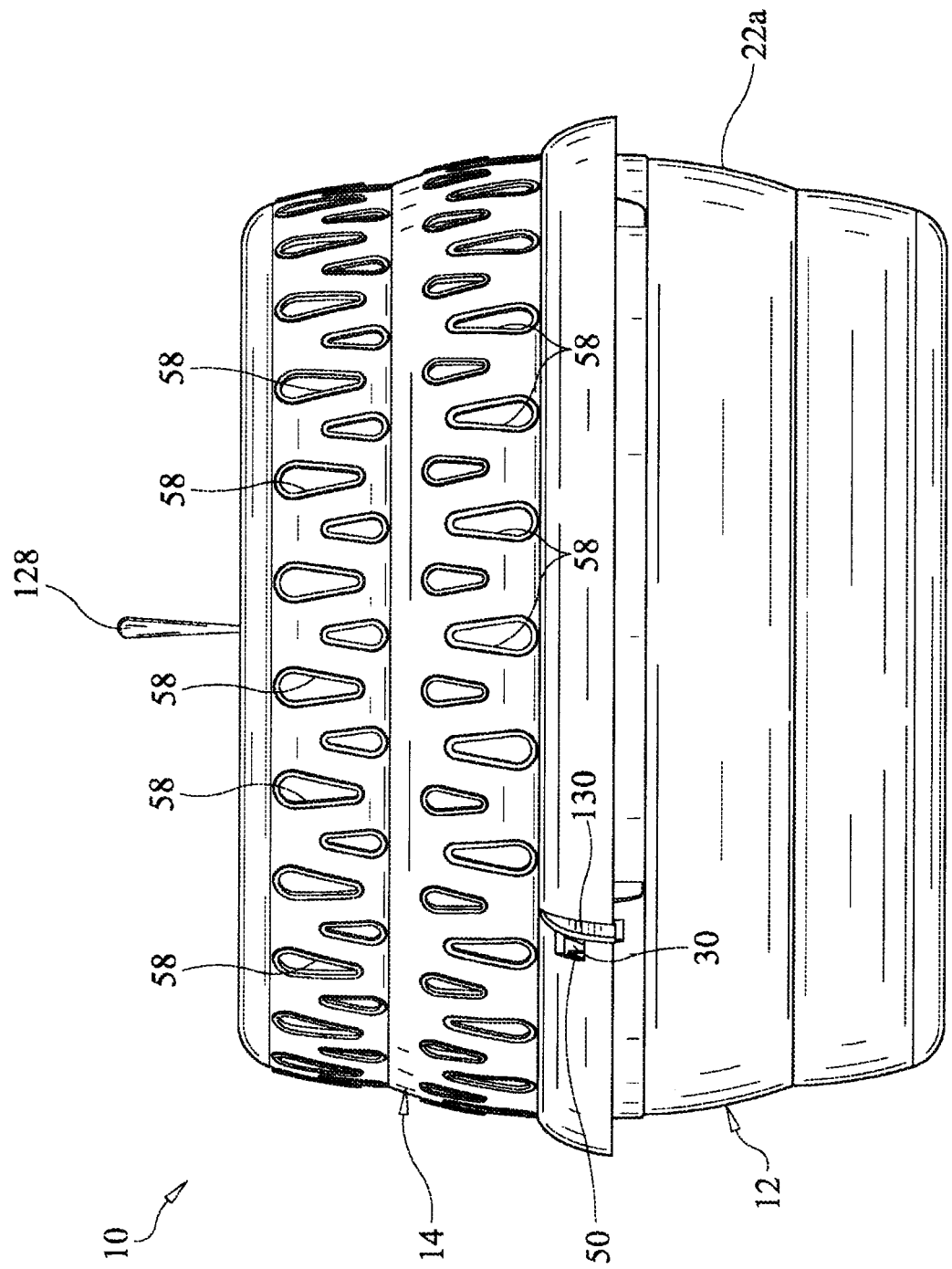
FIG. 5 is a rear view of the pet kennel/pet carrier in accordance with the first embodiment.
Figure 6:
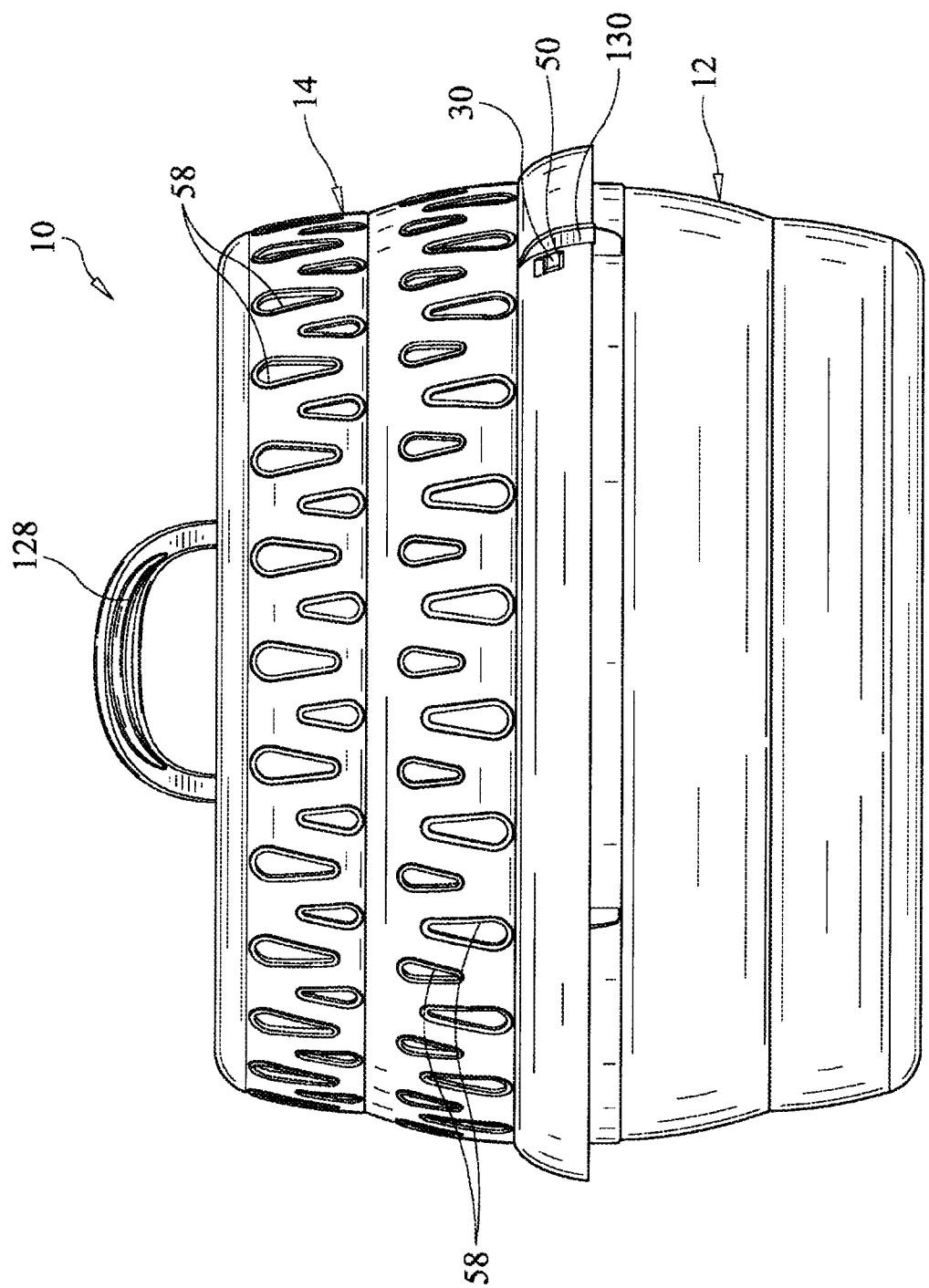
FIG. 6 is a front view of the pet kennel/pet carrier in accordance with the first embodiment.

As shown in FIGS. 1, 3, 7 and 10-14, the top surface 40 of the top portion can include the opening 16 therein. The opening 16 is the only opening in the carrier 10 that is sized and configured to enable an animal to enter or exit the carrier 10. Furthermore, the opening 16 enables an animal to enter or exit the carrier 10 in a vertical manner when the bottom portion 12 is placed on a horizontal surface. In the depicted embodiment, the opening 16 has an inner circumference such that the opening 16 has a generally oval shape or configuration. Specifically, as shown in FIGS. 3, 13 and 14, the opening 16 can have a first straight edge area 60, a second straight edge area 62, a first curved part 64 and a second curved part 66. Opposite ends of the first straight edge area 60 include first hinge/latch receiving openings 70 that are described further below. Opposite ends of the second straight edge area 62 include second hinge/latch receiving openings 72 that are also described in greater detail below.

As shown in FIGS. 3, 7, 10 and 11-14, the cover portion 18 is dimensioned and shaped to fit within the opening 16 of the top portion 14. The outer circumference of the cover portion 18 has the same general shape as the inner circumference of the opening 16. In the depicted embodiment the cover portion 18 has portions with an outer circumference such that the cover portion 18 has a generally oval shape or configuration. Specifically, in the depicted embodiment the cover portion 18 can have a first straight edge area 80 or side 80, a second straight edge area 82 or side 82, a first curved part 84 and a second curved part 86. The first straight edge area 80 includes a first recess 90 dimensioned to receive and retain a first hinge/latch structure 92 that interacts with the first hinge/latch receiving openings 70 of the top section 14. The second straight edge area 82 includes a second recess 94 dimensioned to receive and retain a second hinge/latch structure 96 that interacts with the second hinge/latch receiving openings 72 of the top section 14.

As shown in FIG. 3, portions of the opening 16 align and are shaped to complement portions of the cover portion 18. Specifically, with the cover portion 18 attached to the top portion 14 and the cover portion 18 in a closed position (FIG. 3), the straight edge area 80 is adjacent to the first straight edge area 60 and defines a small generally uniform gap therebetween. The straight edge area 82 is adjacent to the first straight edge area 62 and defines a small generally uniform gap therebetween. Similarly, the first curved part 84 of the cover portion 18 is adjacent to the first curved area 64 of the opening 16 of the top portion 14, and the second curved part 86 of the cover portion 18 is adjacent to the second curved area 66 of the opening 16 of the top portion 14, defining a generally uniform gap therebetween.

Figure 10:
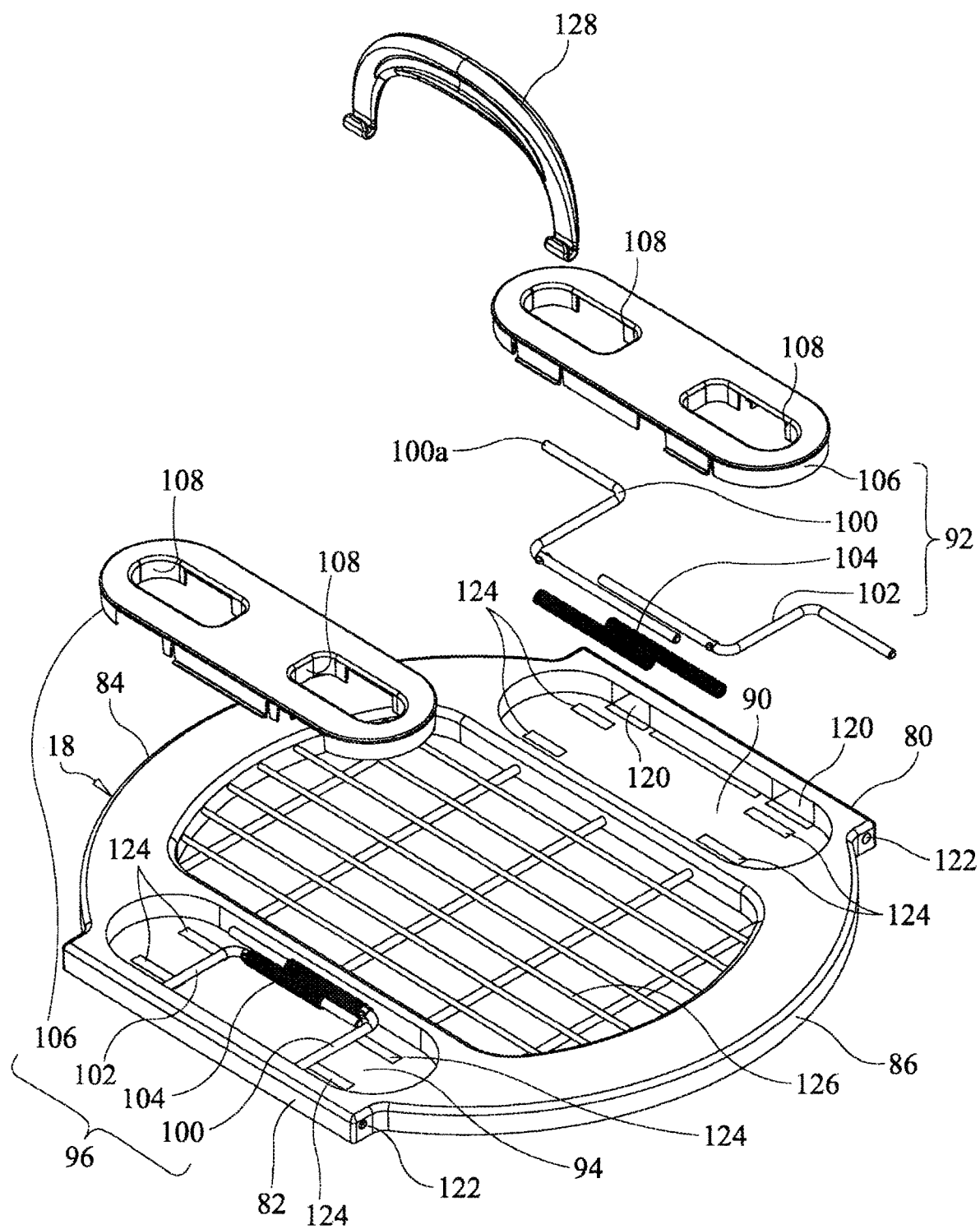
FIG. 10 is an exploded perspective view of the cover of the pet kennel/pet carrier showing a grating, a first hinge/latch mechanism and a second hinge/latch mechanism in accordance with the first embodiment.

As shown in FIG. 10, the first hinge/latch structure 92 includes a first Z-shaped member 100, a second Z-shaped element 102, a biasing element 104 and a retaining cover 106 with openings 108. The second hinge/latch structure 96 is basically identical to the first hinge/latch structure 96 having duplicates of the first Z-shaped member 100, the second Z-shaped element 102, the biasing element 104 and the retaining cover 106 with the openings 108.

The first hinge/latch structure 92 and the second hinge/latch structure 94 are structurally the same, except that the first hinge/latch structure 92 is installed to the first recess 90 at the first straight edge area 80 and the second hinge/latch structure 94 is installed to the second recess 94 of the cover portion 18 at the second straight edge area 82 of the cover portion 18. A description of the first hinge/latch structure 92 is now provided with reference to FIGS. 3 and 10-14. A description of the second hinge/latch structure 94 is omitted for the sake of brevity because description of one of the first hinge/latch structure 92 and the second hinge/latch structure 94 applies equally to the other.

As shown in FIG. 10 comparing the first hinge/latch structure 92 with the second hinge/latch structure 94, the first Z-shaped member 100 is inserted into a slot 120 formed in the first straight edge area 80 of the the cover portion 18. The slot 120 is aligned with and continuous with an opening 122 at an adjacent lateral side of the first straight edge area 80. When the first Z-shaped member 100 is completely installed to the cover portion 18, a portion of the first Z-shaped member 100 can slide along the slot 120 with a distal end 100a being moved to a location within the opening 122 and a position where the distal end 100a extends out of the opening 122. The recess 90 includes protrusions 124 that restrict the first Z-shaped member 100 to sliding movement only once the retaining cover 106 is installed into the first recess 90.

The second Z-shaped element 102 is similarly installed to the first recess 90. The second. Z-shaped member 100 is inserted into another slot 120 formed in the first straight edge area 80 of the the cover portion 18. The slot 120 is aligned with and continuous with another opening 122 opposite the above mentioned opening 122 at an adjacent lateral side of the first straight edge area 80. When the second. Z-shaped member 102 is completely installed to the cover portion 18, a portion of the second Z-shaped member 102 can slide along the slot. 120 with a distal end 100a being moved to a location within the opening 122 and a position where the distal end 102*a* extends out of the opening 122. The recess 90 includes protrusions 124 that restrict the second Z-shaped member 102 to sliding movement only once the retaining cover 106 is installed into the first recess 90. As can be seen in FIG. 10, the biasing member 104 (for example as spring) is connected to both the first Z-shaped member 100 and the second Z-shaped member 102 such that they are urged to move in opposite lateral directions. In other words, the the first Z-shaped member 100 and the second Z-shaped member 102 are urged to move to a position where the distal ends 100*a* and 102*a* extend outward from the openings 122 and outward from the first straight edge area 80. Once the first and second Z-shaped members 100 and 102 are installed with the biasing element 104 to the first recess 90, the retaining cover 106 is snapfitted into the first recess 90 thereby retaining the first and second Z-shaped members 100 and 102 and the biasing element 104 within the first recess 90.

As shown in FIGS. 3 and 10, portions of each of the first and second Z-shaped members 100 and 102 are exposed through the openings 108 in the retaining cover 106. A pet owner can press on the two exposed portions of the first and second Z-shaped members 100 and 102 moving them toward one another pulling the distal ends 100*a* and 102*a* such they retract back into the openings slots 122. When the first and second Z-shaped members 100 and 102 are in respective retracted positions, the first straight edge area 80 can be moved between open and closed positions.

The second hinge/latch structure 96 at the second straight edge area 82 is basically identical the the first hinge/latch structure 92. Hence, description of the second hinge/latch structure 96 is omitted for the sake of brevity.

Figure 11:
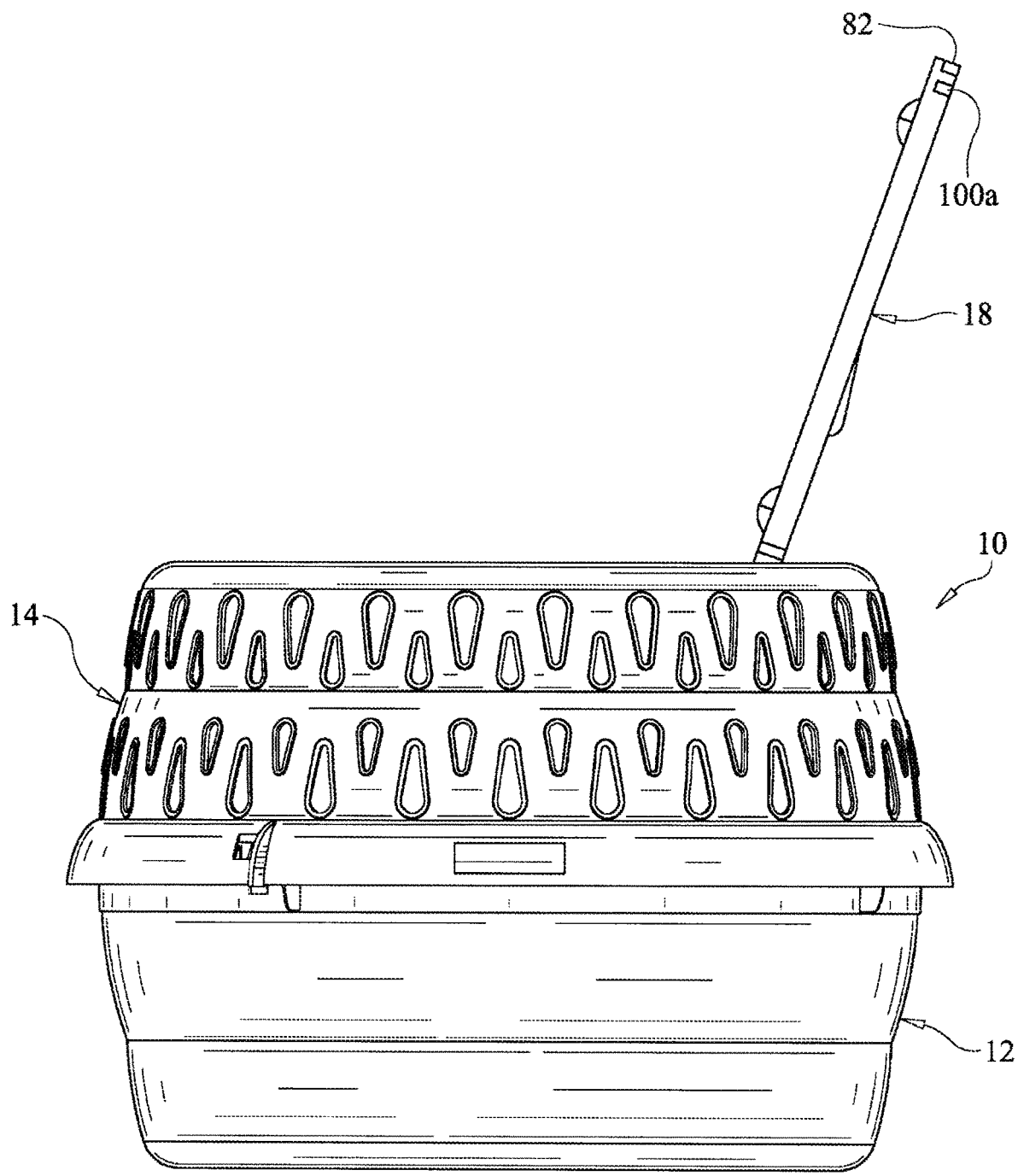
FIG. 11 is a side view of the of the pet kennel/pet carrier showing the cover portion in a first open orientation with the first hinge/latch mechanism operating as a hinge and the second hinge/latch mechanism operated as a latch mechanism in accordance with the first embodiment.
Figure 12:
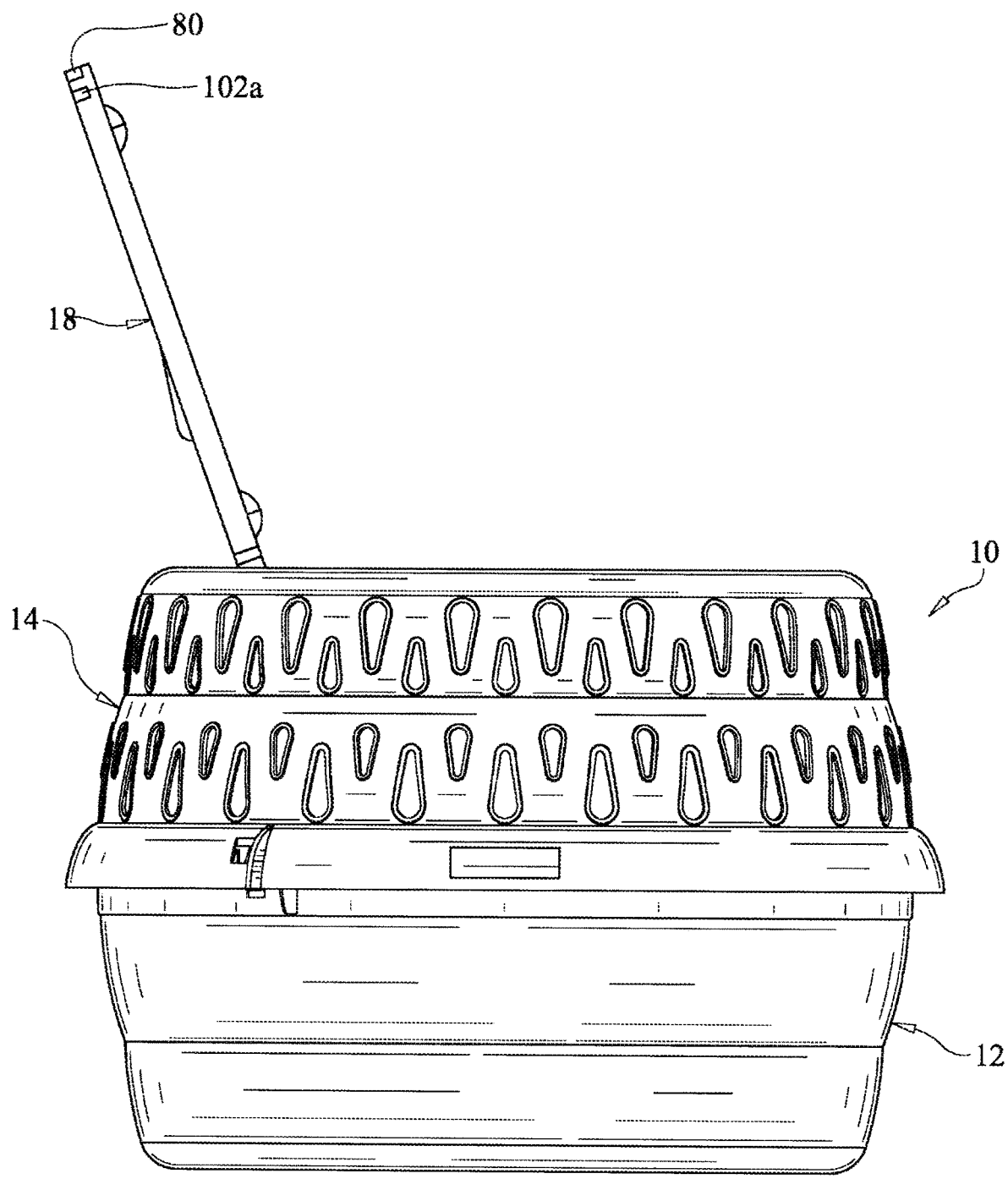
FIG. 12 is a side view of the of the pet kennel/pet carrier similar to FIG. 11 showing the cover portion in a second open orientation with the second hinge/latch mechanism operating as a hinge and the first hinge/latch mechanism operated as a latch mechanism in accordance with the first embodiment.
Figure 15:
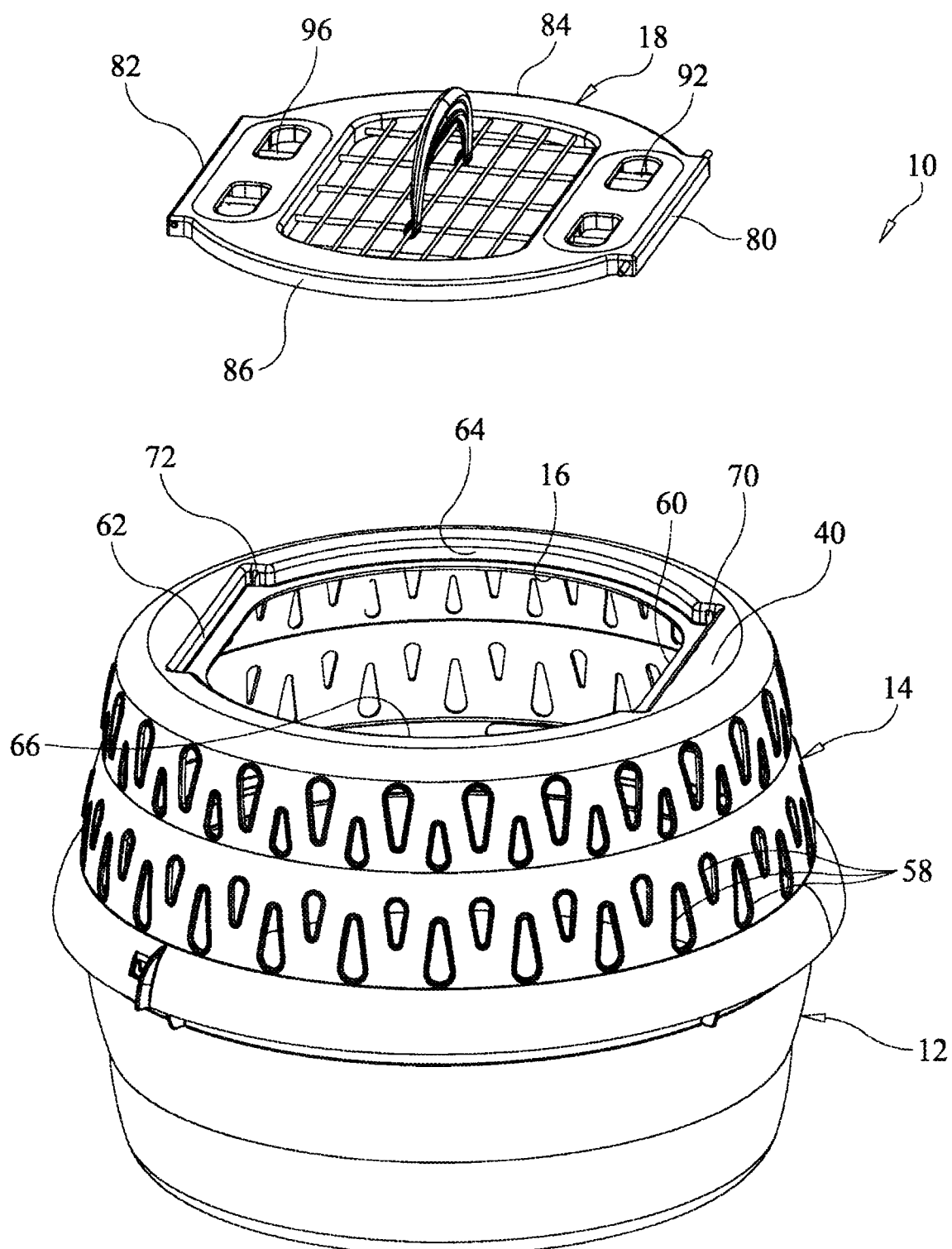
FIG. 15 is a perspective view of the pet kennel/pet carrier with the cover portion completely removed from the top portion in accordance with the first embodiment.

As shown in FIGS. 11-14, when the second hinge/latch structure 96 is operated to release the second straight edge area 82, the first Z-shaped element 100 and the second Z-shaped element 102 of the first hinge/latch structure 92 act as hinges. As shown in FIGS. 11 and 14, the second straight edge area 82 swings upward pivoting about the first Z-shaped element 100 and the second Z-shaped element 102 of the first hinge/latch structure 92. Conversely, when the first hinge/latch structure 92 is operated to release the first straight edge area 80, the first Z-shaped element 100 and the second Z-shaped element 102 of the second hinge/latch structure 96 act as hinges. As shown in FIGS. 12 and 13, the second straight edge area 82 swings upward pivoting about the first Z-shaped element 100 and the second Z-shaped element 102 of the first hinge/latch structure 92. Further, as shown in FIG. 15, the cover portion 18 can be completely removed from the top portion 14.

The cover portion 18 further includes a grating 126 that, along with the plurality of vent holes 58 provides ventilation and fresh air into the interior of the pet carrier 10. A handle 128 is fixed to the grating 126 and provides a pet owner with a convenient means for lifting and carrying the pet carrier 10. The vent holes 58 and the grating 126 also allow a pet to see outside the pet carrier 10 when placed within the pet carrier 10. Allowing the pet to see outside the pet carrier 10 can make the pet feel more at ease and calm. It is further noted that the opening in the cover portion 18 that receives the grating 126 can be blocked or restricted in any suitable manner with any suitable structure and in an alternative embodiment, the opening can be completely blocked or be nonexistent.

Figure 16:
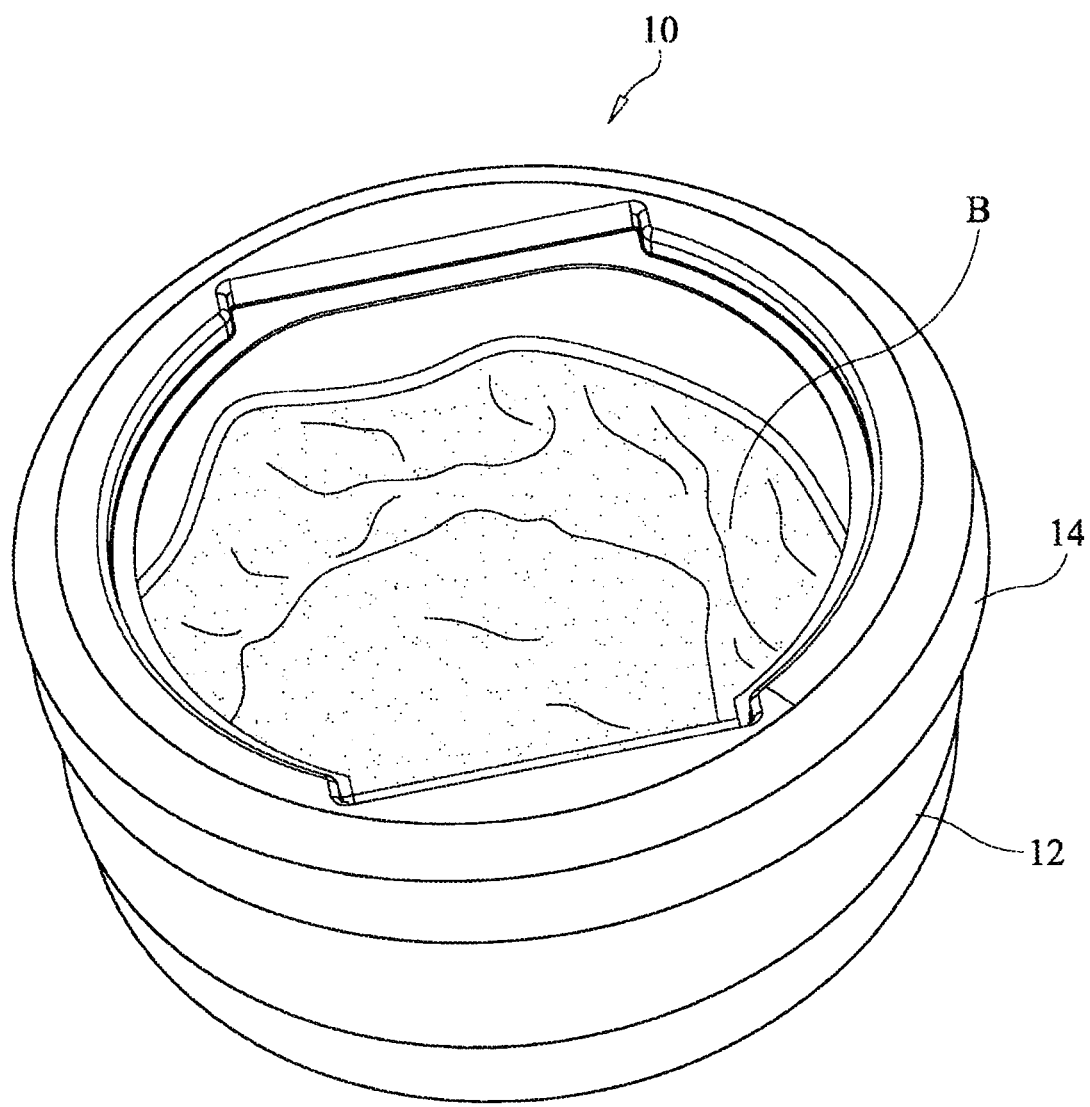
FIG. 16 is a perspective view of the bottom portion removed from the top portion with a blanket such that the bottom portion serves as a bed for a pet in accordance with the first embodiment.

The pet carrier 10 is dimensioned and shaped to be versatile such that it can be used for multiple purposes. For example, as shown in FIG. 16, with the top portion 14 and the cover portion 18 removed, the bottom portion 12 can be used as a pet bed. The circular shape of the bottom portion 12 provides a comforting space for a pet. A blanket B can be placed within the bottom portion 12 to provide added comfort for a pet bed.

Figure 18:
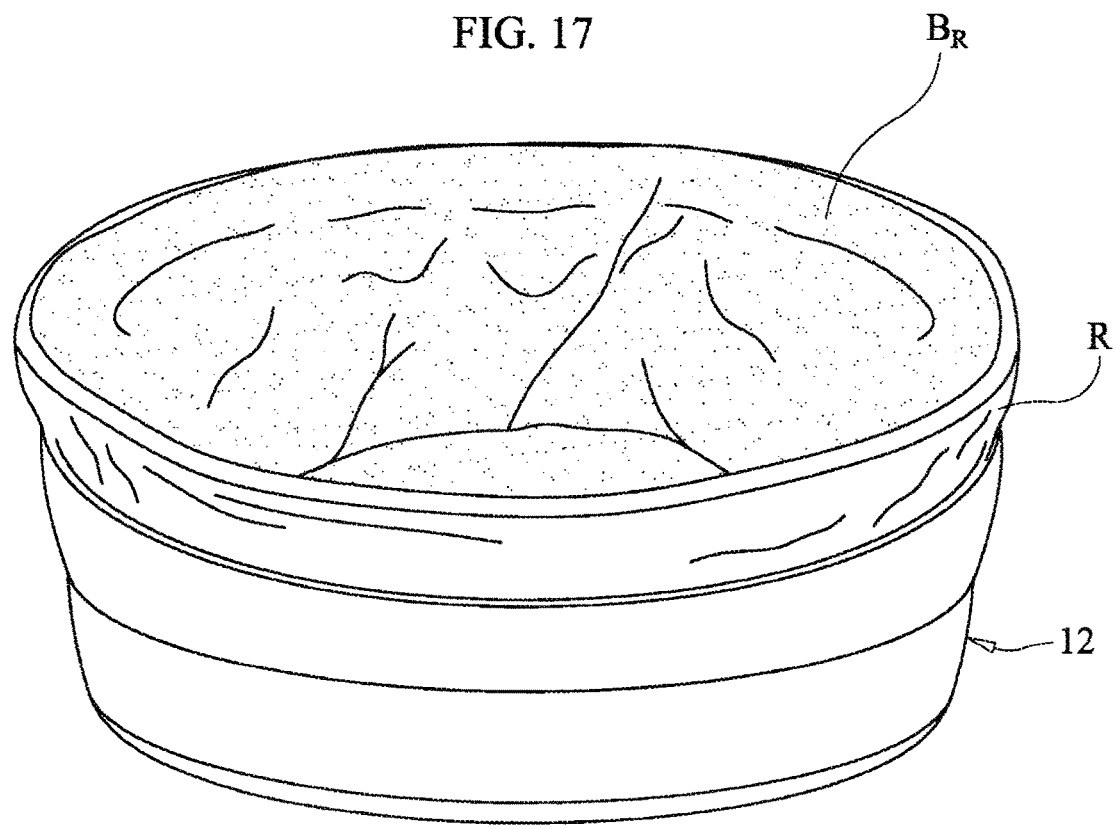
FIG. 18 is another prespective view of the bottom portion similar to FIG. 17 showing a blanket with an elastic band fixed thereto with being installed to the bottom portion in accordance with the first embodiment.
Figure 19:
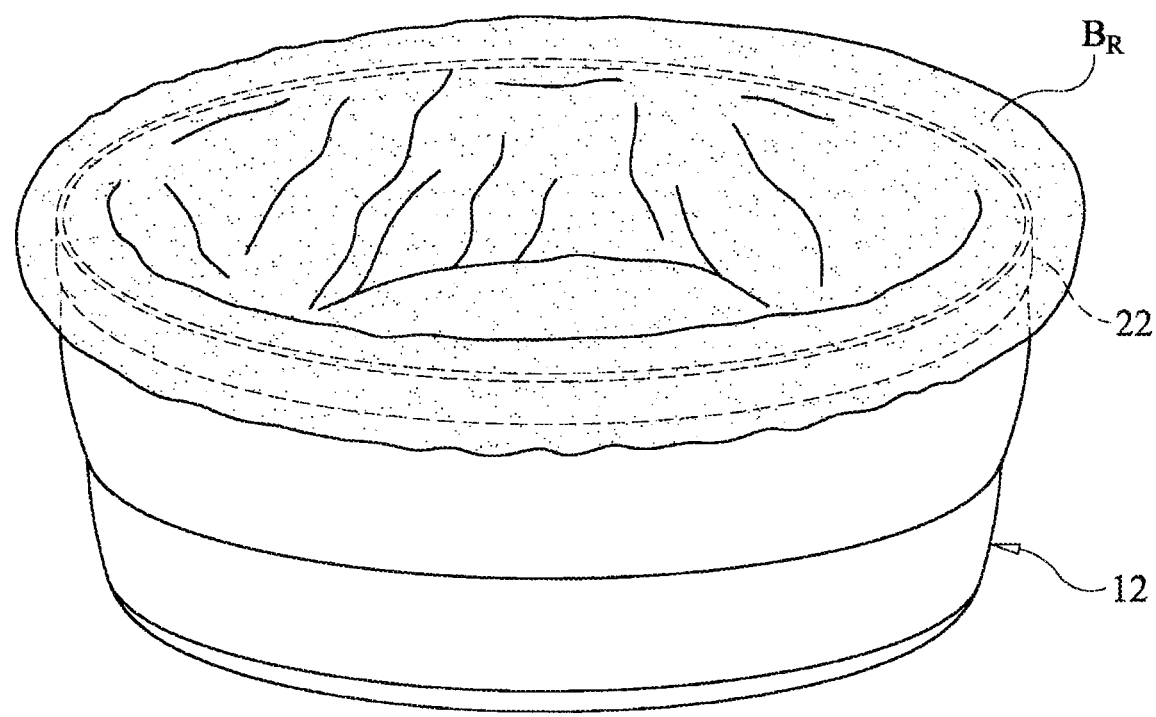
FIG. 19 is yet another prespective view of the bottom portion similar to FIG. 17-18 showing the blanket with an elastic band fully installed to the bottom portion in accordance with the first embodiment.

As shown in FIGS. 17, 18 and 19, the bottom portion 12 can also be made into a fully lined pet bed with the use of a blanket $B_R$ that includes a rubber annular ring or elastic band R. In FIG. 17, the top portion 14 has been removed from the bottom portion 12. In FIG. 18, the blanket $B_R$ is placed in the bottom portion 12, with the elastic band R exposed. Next, in FIG. 19, the elastic band R is inverted and stretched to fit around the upper portion of the side wall 22 such that the blanket $B_R$ covers and conceals the elastic band R. The elastic band R holds the blanket $B_R$ in position around the top of the bottom portion 12 providing a pet with a fully lined inner space to use as a pet bed.

Figure 20:
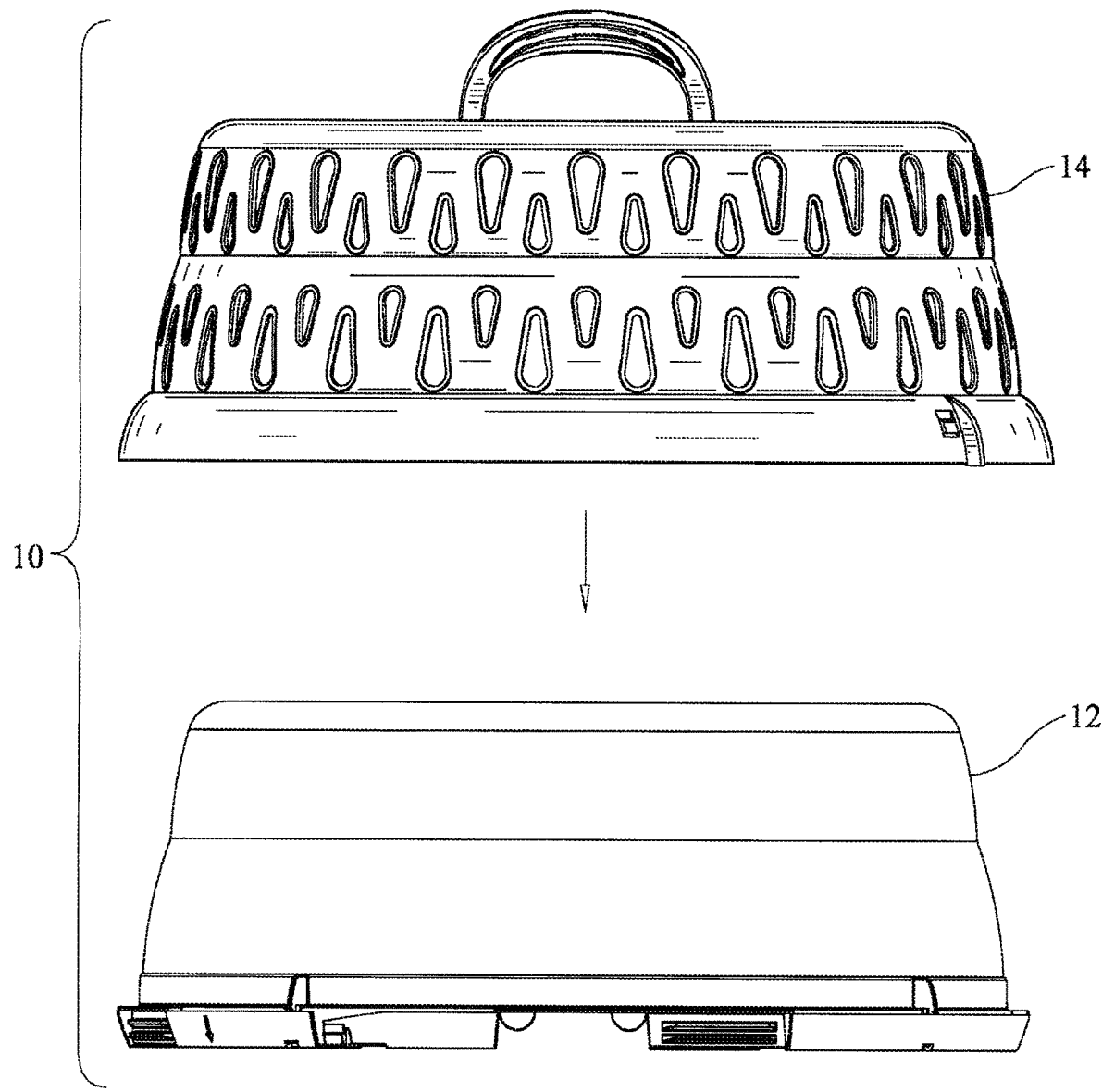
FIG. 20 is a side view of the bottom portion and the top portion with the bottom portion inverted (turned upside down) in preparation for nestling and stacking the pet kennel/pet carrier in accordance with the first embodiment.
Figure 21:
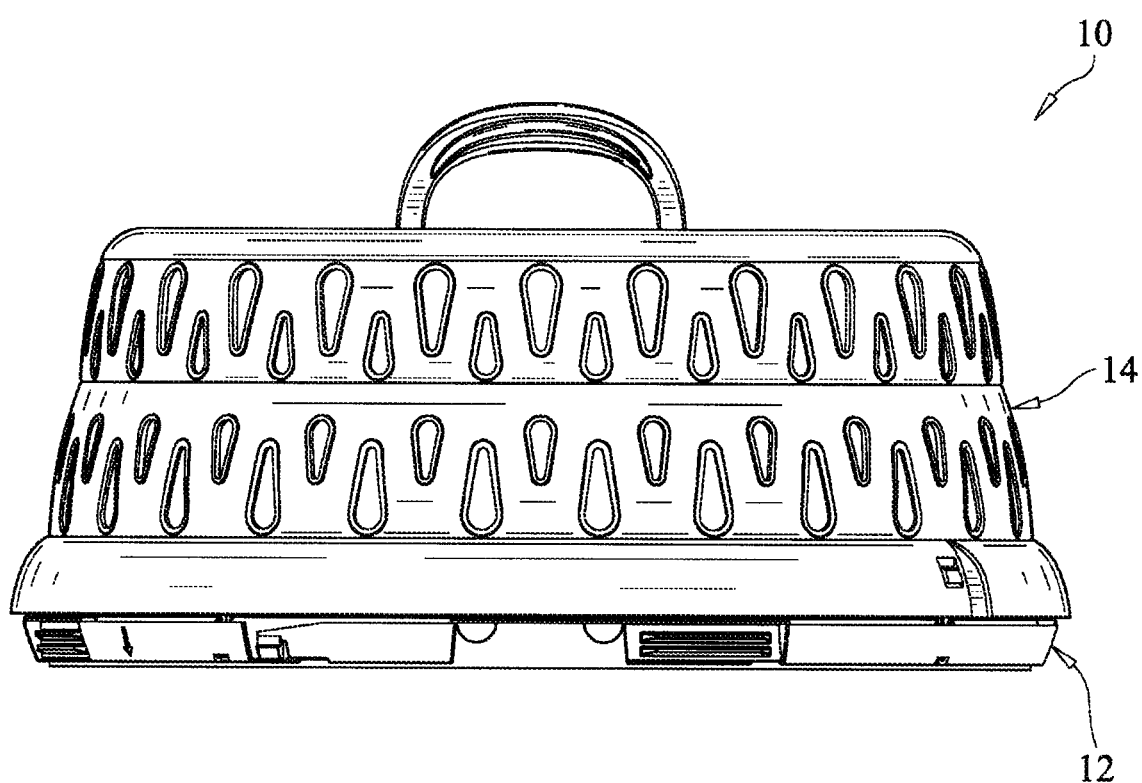
FIG. 21 is another side view of the bottom portion and the top portion nestled together in accordance with the first embodiment.

As shown in FIGS. 20 and 21, the bottom portion 12 and the top portion 14 of the pet carrier 10 are dimensioned to fit into one another or nestle together. Specifically, the conical shape of the bottom portion 12 is dimensioned such that when inverted or positioned upside down, the top portion 14 can be fitted over the bottom portion 12. In other words, the top portion 14 is stacked on to the bottom portion 12 with the majority of the bottom portion 12 being concealed within the top portion 14 defining a nestled carrier 10 oriented for storage. More specifically, between 80 and 90 percent of the bottom portion 12 fits into and is concealed by the top portion 14. Hence, when stored, the nestled pet carrier 10 in FIG. 21 takes up about half of the volume of space as the pet carrier 10 does when fully assembled, as shown in FIG. 1.

Figure 22:
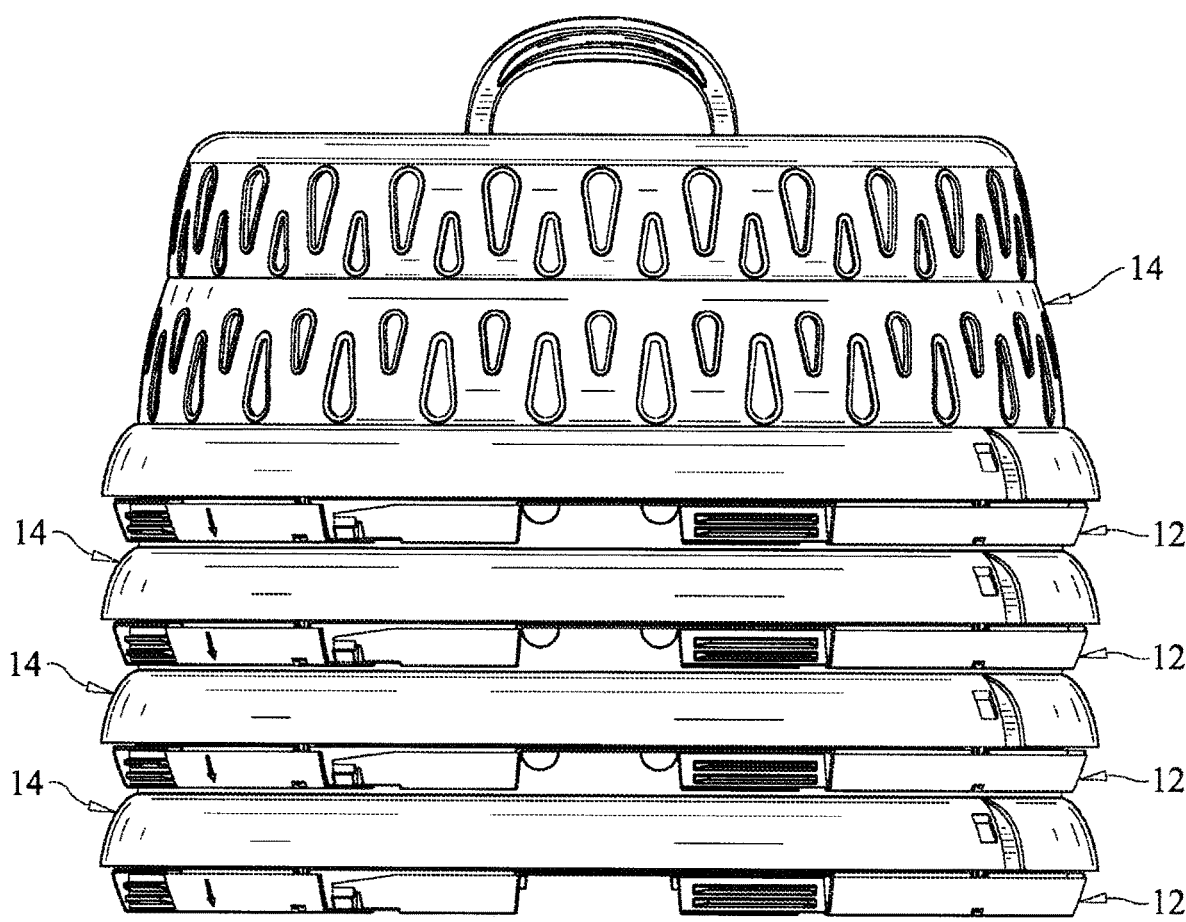
FIG. 22 is yet another side view of nestled pairs of the bottom portion and the top portion stacked with other top and bottom portions for more compact shipping of the pet kennel/pet carrier in accordance with the first embodiment.

The nestling of the bottom portion 12 into the top portion 14 provides yet another advantage. When shipping the pet carrier 10, stacks of pet carriers 10 can be nestled together as shown in FIG. 22. In FIG. 22, four complete pet carriers 10 are nestled or stacked one on top of the next. It should be understood from the drawings and the description herein that 10 or 20 pet carriers 10 can be nestled and stacked together making shipping of multiple pet carriers 10 less space intensive and reducing costs associated with shipping and storage in a warehouse setting. In other words, the volume of space necessary to ship a plurality pet carriers 10 can be reduced by almost 50% with the pet carriers 10 nestled and stacked on top of one another, as shown in FIG. 22.

Figure 23:
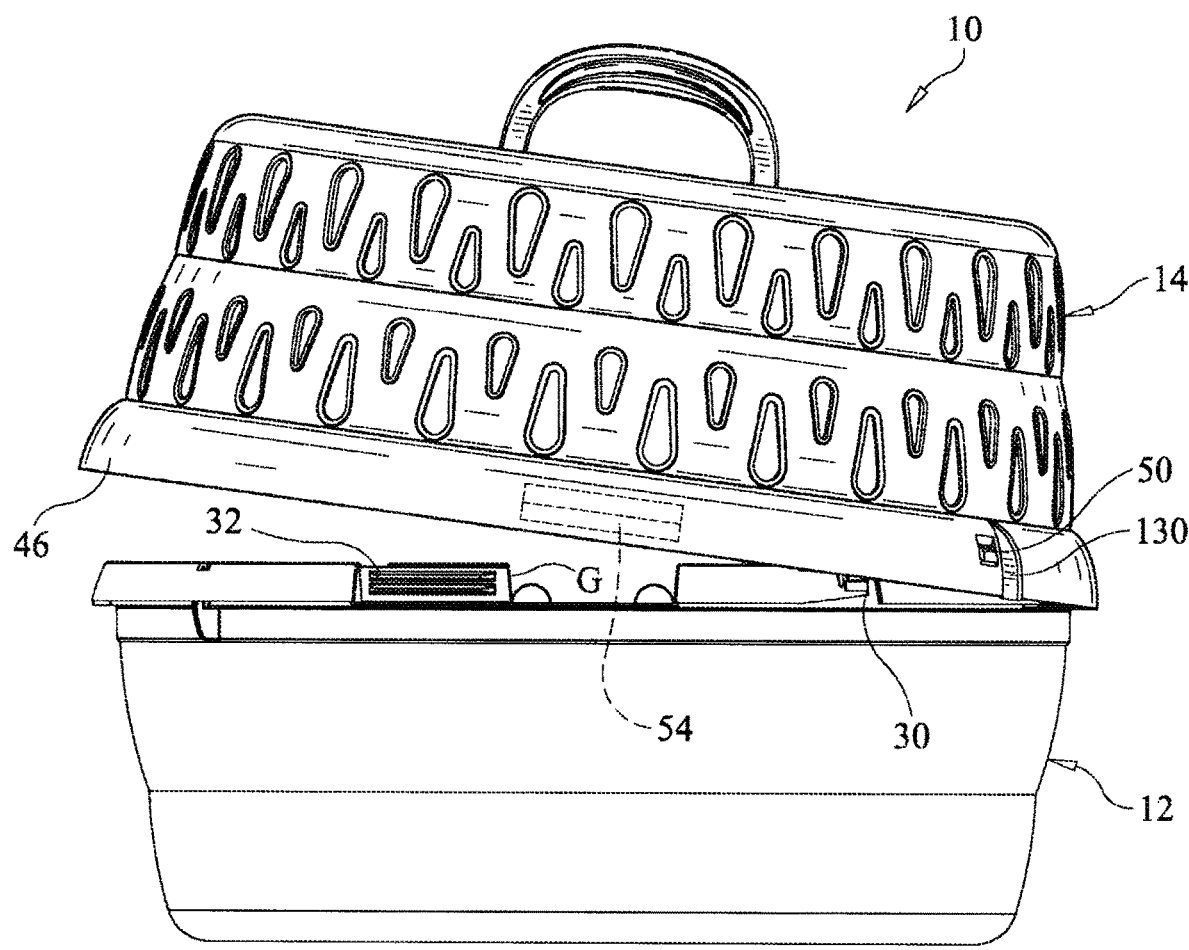
FIG. 23 is a side view of the pet kennel/pet carrier with the top portion shown in a first step in a process for attaching the top portion to the bottom portion in accordance with the first embodiment.
Figure 24:
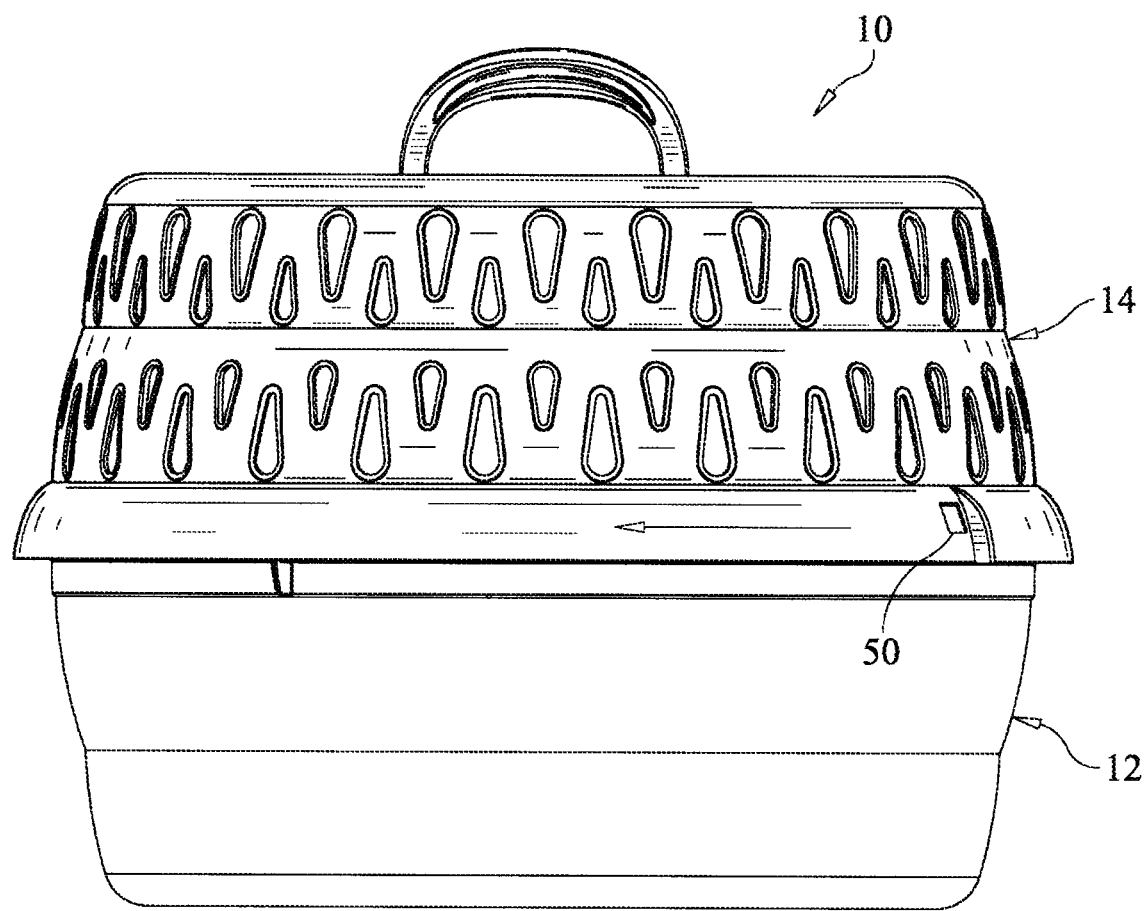
FIG. 24 is another side view of the pet kennel/pet carrier with the top portion seated on the bottom portion in a second step of the process for attaching the top portion to the bottom portion in accordance with the first embodiment.
Figure 25:
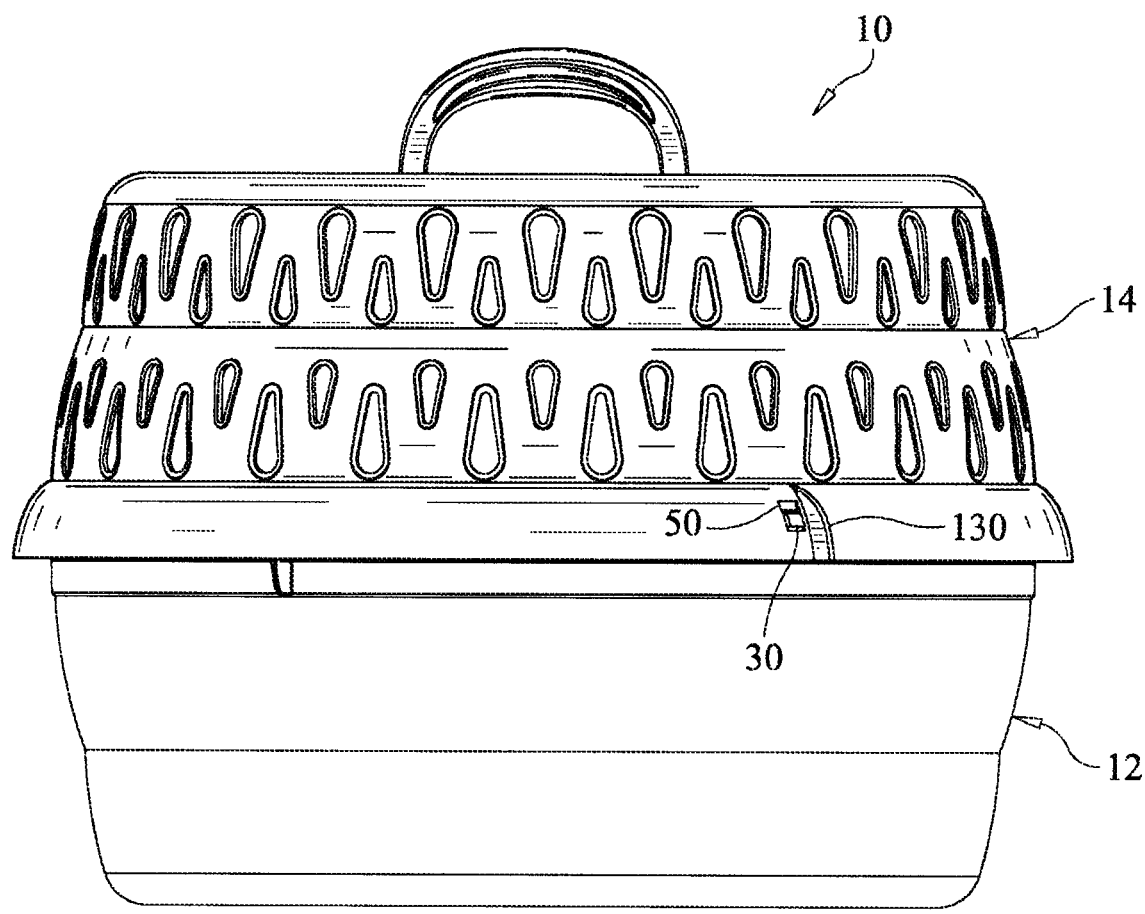
FIG. 25 is a final side view of the pet kennel/pet carrier showing the top portion rotated relative to the bottom portion thereby locking the top portion to the bottom portion in accordance with the first embodiment.

The top portion 14 is shaped and dimensioned to easily install to the bottom portion 12 as shown in FIGS. 23-25. To assemble the pet carrier 10, there are several steps. First, as shown in FIG. 23, the top portion 14 is aligned with the bottom portion 12 such that the circumferentially extending thread section 54 of the top portion 14 alignment with the gap G in the bottom portion 12. The circumferentially extending thread section 54 have a circumferential or annular length that is slightly less than a circumferential length of the gap G in the bottom portion 12. Once the circumferentially extending thread section 54 of the top portion 14 is inserted into the gap G of the bottom portion 12, as shown in FIG. 24, the top portion 14 can then be rotated in a clockwise direction relative to the bottom portion 12. A projection 130 is provided formed with or otherwise fixed to the top portion 14 is provided to assist the pet owner rotating the top portion 14. Put another way, the projection 130 is pushed to the left in FIG. 24 such that the projection 130 and the top portion 14 rotates moving the circumferentially extending thread section 54 of the top portion 14 into engagement with the circumferentially extending thread sections 32 of the bottom portion 12 thereby attaching the top portion 14 to the bottom portion 12.

Further, as the top portion 14 rotates relative to the bottom portion 12, the openings 50 move into alignment with the radially outwardly biased latch members 30 such that the latching member 30 pop outward into the openings 50 in the bottom ring 46 of the top portion 14. To release the top member 14 from the bottom portion 12, the latch members 30 (buttons) are pushed inward allowing the top portion 14 to rotate relative to the bottom portion 12.

There are four gaps G and four sets of the circumferentially extending thread sections 32 defined on the upper edge 26 of the bottom portion 12, as shown in FIG. 17. Correspondingly, there are four sets of the circumferentially extending thread section 54 formed or defined on the bottom ring 46 of the top portion 14 that mate with the four sets of the circumferentially extending thread sections 32. Although only one opening 50 and one latch member 30 are shown in FIG. 25, there can be one, two or three pairs of the latch members 30 and the opening 50 depending upon the design of the pet carrier 10. In the depicted embodiment, there are two latch members 30 and two openings 50.

The bottom portion 12, the top portion 14 and the cover portion 18 preferably include or are formed of molded plastic.

In an alternative embodiment, one of the second hinge/latch structure 96 of the cover portion 18 can be eliminated and replaced with a fixed pivot shaft that does not allow independent opening and closing about the first hinge/latch structure 96. In this alternative embodiment the first hinge/latch structure 92 is the only structure that can be used to open and close the pet carrier 10 when fully assembled.

Second Embodiment

Referring now to FIGS. 26-29, a pet carrier 10' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 26:
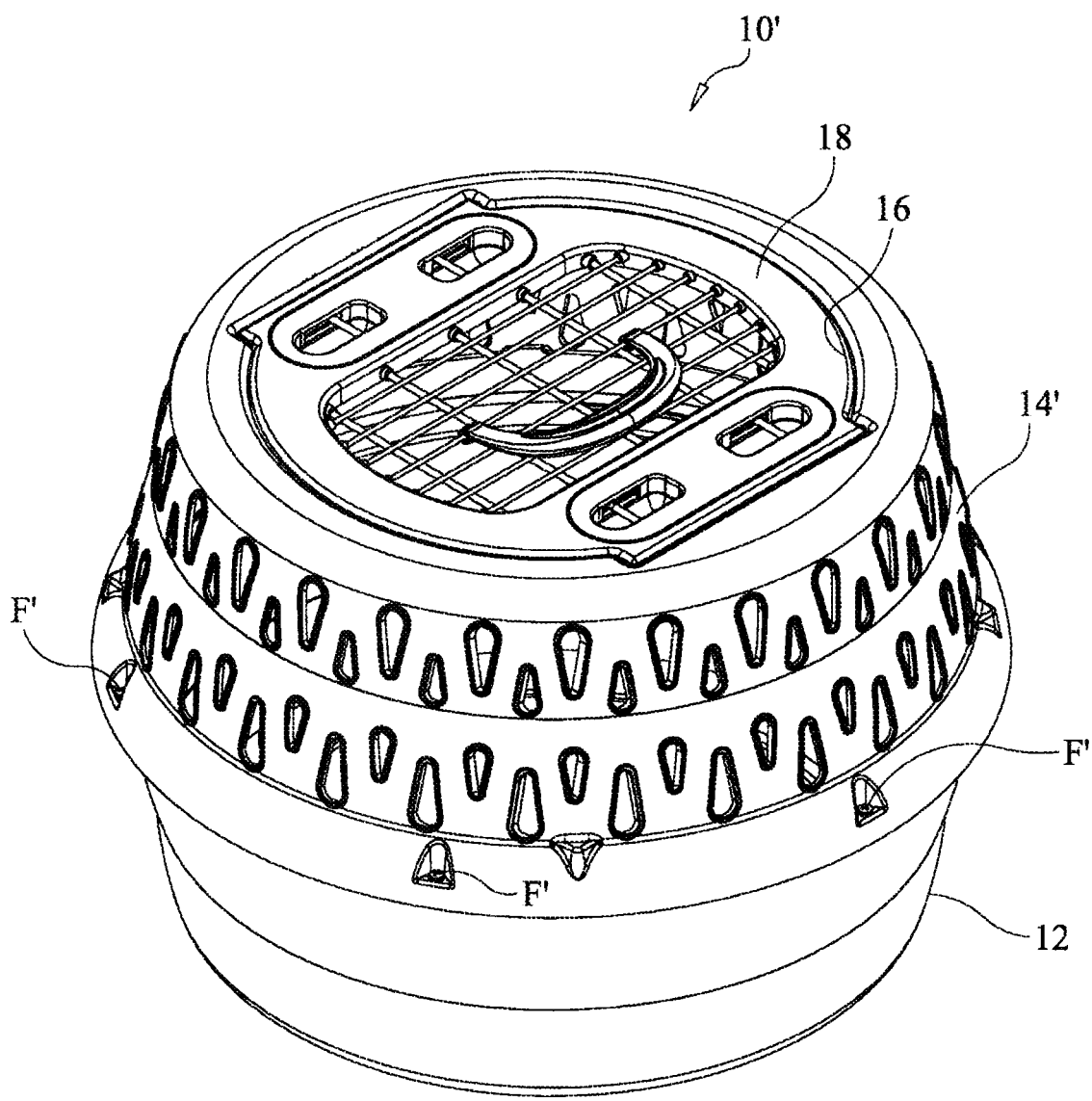
FIG. 26 is a top perspective view of a pet kennel/pet carrier in accordance with a second embodiment.
Figure 27:
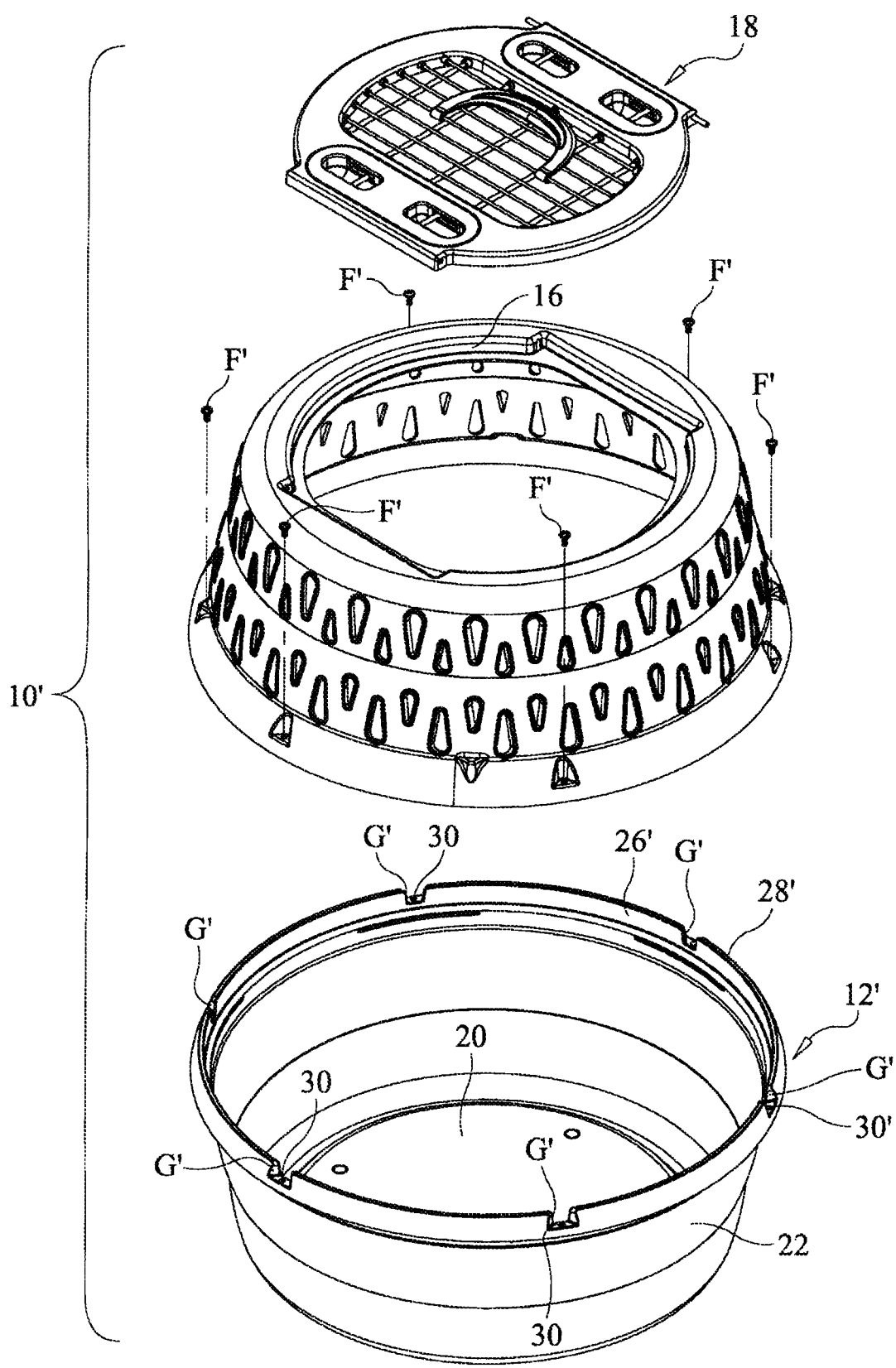
FIG. 27 is an exploded top perspective view of the pet kennel/pet carrier showing a bottom portion, a top portion and a cover portion of the pet kennel/pet carrier in accordance with the second embodiment.
Figure 28:
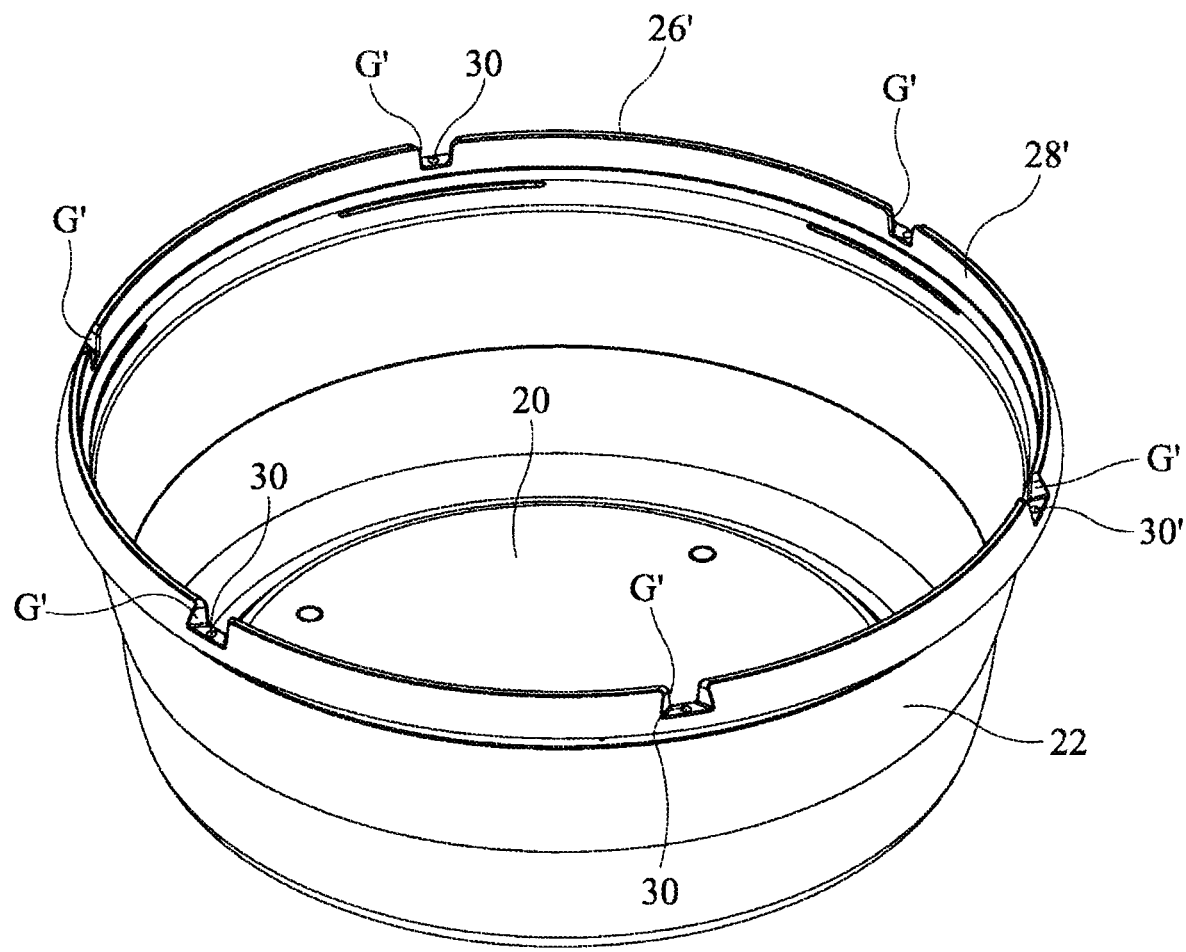
FIG. 28 is a top perspective view showing the bottom portion of the pet kennel/pet carrier removed from the top portion of the pet kennel/pet carrier in accordance with the second embodiment.
Figure 29:
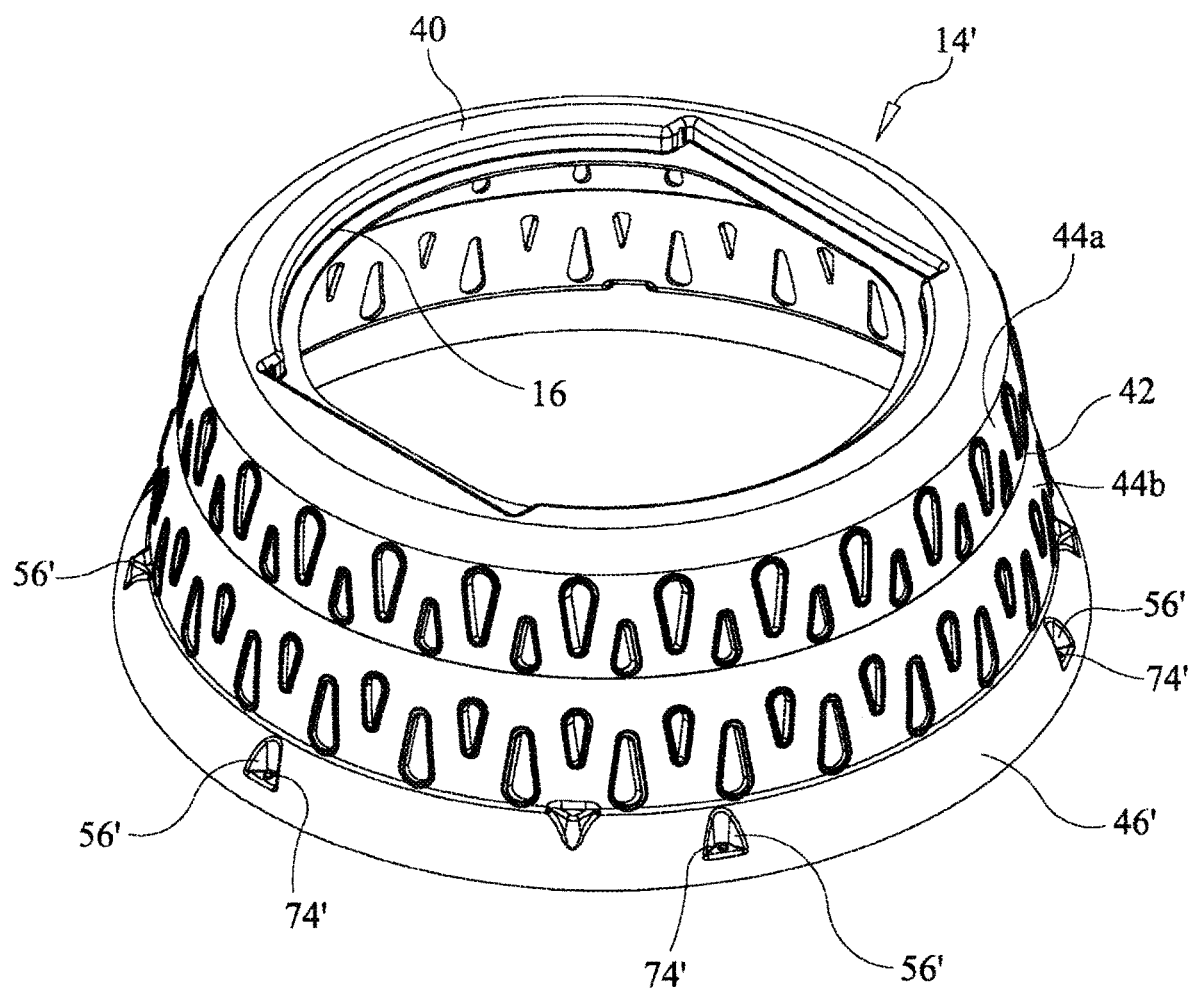
FIG. 29 is a top perspective view showing the top portion of the pet kennel/pet carrier removed from the bottom portion of the pet kennel/pet carrier in accordance with the second embodiment.

As shown in FIGS. 26 and 27, the pet carrier 10' includes a bottom portion 12' and a top portion 14'. The top portion 14' includes the opening 16. The opening 16 has all the features described above with respect to the first embodiment. Further, the pet carrier 10' includes the cover portion 18 that opens and closes relative to the opening 16 of the top portion 14', as is also described above with respect to the first embodiment. Hence, the descriptions of the opening 16 and the cover portion 18 are omitted for the sake of brevity since they are the same as the description of the first embodiment of the pet carrier 10.

The bottom portion 12' includes the many of the features of the bottom portion 12 in accordance with the first embodiment of such as the bottom wall 20 and the side wall 22. However, in the second embodiment the upper edge 26 of the first embodiment is replaced with an upper edge 26'. The upper edge 26' of the bottom portion 12' in accordance with the second embodiment includes an annular upwardly extending projection 28' with a plurality of gaps G formed therein. A lower surface portion of each gap G includes a threaded opening 30' that receives fasteners F, as described in greater detail below.

The top portion 14' includes the many of the features of the top portion 14 in accordance with the first embodiment of such the top surface 40 with the opening 16 (the opening 16 having all the features described with reference to the first embodiment), the side wall 42 and the rings 44a and 44b. However, in the second embodiment the bottom ring 46 of the top portion 14 of the first embodiment has been modified defining a bottom ring 46'. The bottom ring 46' is a curved annular ring that includes a plurality of concaved or recessed areas 56' each having a corresponding opening 74'. The recessed areas 56' are spaced apart from one another such that the recessed areas 56' align with respective ones of the gaps G in the projection 28' of the bottom portion 12' and each of the corresponding openings 74' align with respective ones of the threaded openings 30' in the upper edge 26' of the bottom portion 12' of the pet carrier 10'.

When the top portion 14' is set atop the bottom portion 12' such that the corresponding openings 74' align with respective ones of the threaded openings 30' in the upper edge 26' of the bottom portion 12' of the pet carrier 10', the fasteners F' are inserted into respective ones of the opening 74' and threaded into respective ones of the threaded openings 30'. Once tightened, the fasteners F' rigidly fix the top portion 14' to the bottom portion 12'.

The bottom portion 12' has all the benefits of the first embodiment as described above and depicted in FIGS. 16, 18 and 19. The top portion 14' and the cover portion 18 have all the benefits of the first embodiment as described above and depicted in FIGS. 11-15.

Further, the top portion 14' and the bottom portion 12' of the pet carrier 10' are stackable in exactly the same manner as the top portion 14 and the bottom portion 12 of the pet carrier 10 of the first embodiment, as described above and depicted in FIGS. 20-22.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms. "including", "having" and their derivatives. Also, the terms "part," "section," "portion," "member" or "element" when used in the singular can have the dual meaning of a single part or a plurality of parts. Also as used herein to describe the above embodiment(s), the following directional terms "front", "downward", "vertical", "horizontal", and "transverse" as well as any other similar directional terms refer to those directions relative a carrier. Accordingly, these terms, as utilized to describe the present invention should be interpreted relative to a carrier.

The term "configured" as used herein to describe a component, section or part of a device includes hardware and/or software that is constructed and/or programmed to carry out the desired function.

The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A carrier comprising:
a body with a rounded bottom portion and a rounded top portion and an opening in the top portion, the bottom portion defining an overall substantially flat surface, the bottom portion extending between the substantially flat surface and an edge, the opening being an only opening sized and configured to enable an animal to enter or exit the body and enables the animal to enter or exit the body in a vertical manner when the bottom portion is placed on a surface, the bottom portion having a plurality of substantially upwardly extending protrusions with gaps defined between corresponding ones of the upwardly extending protrusions, the substantially upwardly extending protrusions extending from the edge of the bottom portion, the top portion having a plurality of spaced apart recessed areas configured to align with the gaps of the bottom portion, the opening in the top portion defining a plurality of latch receiving openings; and
a cover assembly sized and configured to fit within the opening of the top portion, the cover assembly defining a first pair of openings at a first side and a second pair of openings at a second side opposite the first side, the cover assembly including a first latching mechanism configured to be accessed from the first pair of openings and a second latching mechanism configured to be accessed from the second pair of openings, the first and second latching mechanisms each configured to act as both a hinge and a latch mechanism, the first and second latching mechanisms selectively received at least partially in the latch receiving openings, and at least a portion of each of the first and the second latching mechanisms extending substantially horizontally.

2. The carrier according to claim 1, wherein a lower surface portion of each gap includes a first aperture configured to receive a fastener and each of the recessed areas includes a second aperture configured to receive the fastener, each of the first apertures configured to align with a corresponding one of the second apertures.

3. The carrier according to claim 1, wherein the cover assembly defines a second opening and a grating at least partially blocks the second opening in the cover assembly.

4. The carrier according to claim 1, wherein:
the cover assembly defines a first recess and a second recess;
the first latching mechanism comprises:
a first pin; and
a first retaining cover received within the first recess, the first retaining cover defining the first pair of openings; and
the second latching mechanism comprises:
a second pin; and
a second retaining cover received within the second recess, the second retaining cover defining the second pair of openings.

5. The carrier according to claim 1, wherein each of the first latching mechanism and the second latching mechanism are include a spring loaded push button mechanism.

6. The carrier according to claim 5, wherein each of the first and the second latching mechanisms includes a substantially Z-shaped element configured to be received by one of the latch receiving openings in the top portion.

7. The carrier according to claim 1, wherein:
the first latching mechanism comprises:
a first pin; and
a second pin;
the second latching mechanism comprises:
a third pin; and
a fourth pin; and
each of the first pin, the second pin, the third pin, and the fourth pin extends at least partially horizontally and is coupled within one of the latch receiving openings.

8. The carrier according to claim 1, wherein:
the cover assembly defines an aperture;
the latch receiving openings extend horizontally within the top portion; and
the cover assembly comprises:
a grate coupled within the aperture, the grate comprising a plurality of horizontal members and a plurality of longitudinal members; and
a carrier handle hingedly connected to one of the horizontal members of the grate, the carrier handle configured to support a weight of the top portion and the bottom portion.

9. The carrier according to claim 1, wherein:
the edge is a first edge; and
the top portion includes a second edge configured to overlap an outside of the bottom portion.

10. The carrier according to claim 1, wherein;
the bottom portion is sized and configured to fit within an interior of the top portion when the bottom portion is inverted.

11. A carrier comprising:
a bottom portion having a rounded shape that tapers toward a lower end thereof such that an upper end has a larger diameter than the lower end thereof, the bottom portion extending between the upper end and the lower end, the upper end including an edge, a plurality of upwardly extending protrusions extending vertically from the edge;
a top portion having a rounded shape that tapers toward an upper end thereof such that the lower end has a larger diameter than an upper end thereof, the top portion defining an opening, the lower end of the top portion being releasably attached to the upper end of the bottom portion, the top portion defining a first latch receiving opening, a second latch receiving opening, a third latch receiving opening, and a fourth latch receiving opening; and
a cover assembly dimensioned to cover the opening in the top portion, the cover assembly defining an aperture, the cover assembly having a first area and a second area opposite the first area, the first area offset from the aperture in a first direction and the second area offset from the aperture in a second direction, the first direction opposite the second direction, the first area defining a first pair of openings, and the second area defining a second pair of openings, the cover assembly having a first latch structure and a second latch structure, the first latch structure configured to be accessed from the first pair of openings, the second latch structure configured to be accessed from the second pair of openings, each of the first latch structure and the second latch structure being configured to operate as a latch mechanism and hinge structure such that when the first latch structure is operated as a latch mechanism the second latch structure functions as a hinge and when the second latch structure is operated as a latch mechanism the first latch structure functions as a hinge, wherein the first latch structure is configured to be selectively received within the first latch receiving opening and the second latch receiving opening, and the second latch structure is configured to be selectively received within the third latch receiving opening and the fourth latch receiving opening, and at least a portion of each of the first latch structure and the second latch structure extends substantially horizontally.

12. The carrier according to claim 11, wherein:
the cover assembly includes:
  a grate coupled within the aperture; and
  a handle hingedly connected to the grate, the handle configured to support the bottom portion and the top portion during transit.

13. The carrier according to claim 11, wherein:
the edge is a first edge; and
the top portion includes a second edge configured to overlap an outside of the bottom portion.

14. The carrier according to claim 11, wherein
the bottom portion is sized and configured to fit within an interior of the top portion when the bottom portion is inverted.

15. The carrier according to claim 11, wherein
the top portion is releasably attached to the bottom portion by a plurality of mechanical fasteners.

16. The carrier according to claim 1, wherein the top portion includes a plurality of rings, the plurality of rings including a first ring defining a first diameter and a second ring defining a second diameter, the second ring positioned farther from the opening in the top portion than the first ring, the second diameter greater than the first diameter.

17. The carrier according to claim 16, wherein:
the plurality of rings further includes a third ring defining a third diameter, the third ring farther from the opening in the top portion than the second ring, the third diameter greater than the second diameter; and
the first ring and the second ring each define a plurality of vent holes.

18. The carrier according to claim 11, wherein:
the first area defines a first recess;
the second area defines a second recess;
the first latch structure comprises:
  a first substantially Z-shaped element;
  a second substantially Z-shaped element; and
  a first retaining cover received within the first recess, the first retaining cover defining the first pair of openings, the first substantially Z-shaped element and the second substantially Z-shaped element each received within the first retaining cover; and
the second latch structure comprises:
  a third substantially Z-shaped element;
  a fourth substantially Z-shaped element; and
  a second retaining cover received within the second recess, the second retaining cover defining the second pair of openings, the third substantially Z-shaped element and the fourth substantially Z-shaped element received each within the second retaining cover.

19. The carrier according to claim 18, wherein the first Z-shaped element, the second Z-shaped element, the third Z-shaped element, the fourth Z-shaped element, the first latch receiving opening, the second latch receiving opening, the third latch receiving opening, and the fourth latch receiving opening each extend substantially horizontally and are generally planar.

20. A carrier comprising:
a bottom portion having a rounded shape that tapers toward a lower end thereof such that an upper end has a larger diameter than the lower end thereof, the bottom portion extending between the upper end and the lower end, the upper end including an edge, a plurality of substantially upwardly extending protrusions extending substantially vertically from the edge;
a top portion having a rounded shape that tapers toward an upper end thereof such that a lower end has a larger diameter than an upper end thereof, the top portion defining an opening, the lower end of the top portion being releasably attached to the upper end of the bottom portion, the top portion defining a first latch receiving opening, a second latch receiving opening, a third latch receiving opening, and a fourth latch receiving opening, the top portion further includes a plurality of straight edge areas and a plurality of curved areas defining the opening in the top portion, the straight edge areas including the first latch receiving opening, the second latch receiving opening, the third latch receiving opening, and the fourth latch receiving opening, the curved areas extending between the straight edge areas, the straight edge areas extending substantially horizontally; and
a cover portion dimensioned to cover the opening in the top portion, the cover portion having a first area and a second area opposite the first area, the first area having a first latch structure and the second area having a second latch structure, each of the first latch structure and the second latch structure being configured to operate as a latch mechanism and hinge structure such that when the first latch structure is operated as a latch mechanism the second latch structure functions as a hinge and when the second latch structure is operated as a latch mechanism the first latch structure functions as a hinge, wherein the first latch structure is configured to be selectively received within the first latch receiving opening and the second latch receiving opening, and the second latch structure is configured to be selectively received within the third latch receiving opening and the fourth latch receiving opening, and at least a portion of each of the first latch structure and the second latch structure extends horizontally.

\* \* \* \* \*